US008370308B2

(12) United States Patent
Hosotsubo

(10) Patent No.: US 8,370,308 B2
(45) Date of Patent: Feb. 5, 2013

(54) DOCUMENT MANAGEMENT SYSTEM, DOCUMENT MANAGEMENT METHOD, AND COMPUTER PROGRAM FOR FORMING PROXY DATA FOR DELETED DOCUMENTS

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/472,186

(22) Filed: May 26, 2009

(65) Prior Publication Data
US 2009/0307242 A1 Dec. 10, 2009

(30) Foreign Application Priority Data
Jun. 6, 2008 (JP) ................................ 2008-149816

(51) Int. Cl.
*G06F 17/00* (2006.01)
(52) U.S. Cl. ........ 707/661; 707/617; 707/640; 715/811; 715/847
(58) Field of Classification Search .............. 707/1, 100, 707/622, 640, 661, 662, 668, 802, 803, 617; 715/810, 811, 847
See application file for complete search history.

(56) References Cited

U.S. PATENT DOCUMENTS

| 6,377,286 | B1 * | 4/2002 | Hochmuth ..................... 715/810 |
| 6,513,051 | B1 * | 1/2003 | Bolosky et al. ........ 707/999.101 |
| 7,117,246 | B2 * | 10/2006 | Christenson et al. ......... 709/206 |
| 7,295,230 | B2 * | 11/2007 | Takahashi et al. ......... 348/231.1 |
| 7,516,420 | B2 * | 4/2009 | Picon et al. .................... 715/847 |
| 7,539,795 | B2 * | 5/2009 | Vahtola ........................... 710/67 |
| 7,685,083 | B2 * | 3/2010 | Fairweather .................... 706/45 |
| 7,814,554 | B1 * | 10/2010 | Ragner ........................... 726/27 |
| 7,818,287 | B2 * | 10/2010 | Torii et al. ..................... 707/600 |
| 7,889,971 | B2 | 2/2011 | Hara |
| 7,953,702 | B2 * | 5/2011 | Tomita ......................... 707/622 |
| 2002/0122076 | A1 * | 9/2002 | Nakaki ......................... 345/847 |

FOREIGN PATENT DOCUMENTS

| JP | 8161210 A | 6/1996 |
| JP | 2002-312209 A | 10/2002 |

* cited by examiner

*Primary Examiner* — Dangelino Gortayo
(74) *Attorney, Agent, or Firm* — Fitzpatrick, Cella, Harper & Scinto

(57) ABSTRACT

When a document in which a shortcut has been set is exchanged to another document, a shortcut to the document before the exchange is enabled to effectively act on the document after the exchange. When a formation of a shortcut of the document is instructed, the shortcut including a document ID of the document is formed and attributes (shortcut formation history) of the document are updated. After that, when a deletion of the document into a trash box and a formation of a proxy entity of the document are instructed, a proxy entity in which a user ID set into the document to be deleted has been set is formed. The proxy entity is formed in a same folder as a folder in which the deletion document exists. The document ID of the deletion document and the document ID of the formed proxy entity are exchanged and the deletion document is moved into the trash box.

8 Claims, 28 Drawing Sheets

| | 4001 | 4002 | 4003 |
|---|---|---|---|
| | ID | NAME | PROPERTIES |
| | 001 | TOM | ... |
| | 002 | JOHN | ... |
| | 003 | SHERRY | ... |
| | 004 | BILLY | ... |
| | 005 | HAWK | ... |
| | ⋮ | ⋮ | ⋮ |

FIG. 4

| | ITEM 5100 | VALUE 5200 |
|---|---|---|
| 5101 | DOCUMENT NAME | DOCUMENT C |
| 5102 | VOLUME DATA ID | VOLUME897871 |
| | SIZE | 514905 |
| | THE NUMBER OF PAGES | |
| 5103 | DOCUMENT TYPE | PDF |
| | VERSION NUMBER | 38 |
| 5104 | OWNER ID | 002978 |
| | ACCESSING RIGHT | DELETE |
| | FORMING TIME/DATE | 01/02/2007 12:28:34 |
| | UPDATING TIME/DATE | 07/08/2007 09:23:01 |
| | ACCESSING TIME/DATE | 11/08/2007 20:19:54 |
| | UNREAD/ALREADY-READ STATE | ALREADY-READ |
| | CHECK-OUT STATE | NO |
| 5105 | SHORTCUT FORMATION HISTORY | |
| 5106 | PROXY ENTITY | |
| 5107 | COMMENTS | |
| | ⋮ | ⋮ |

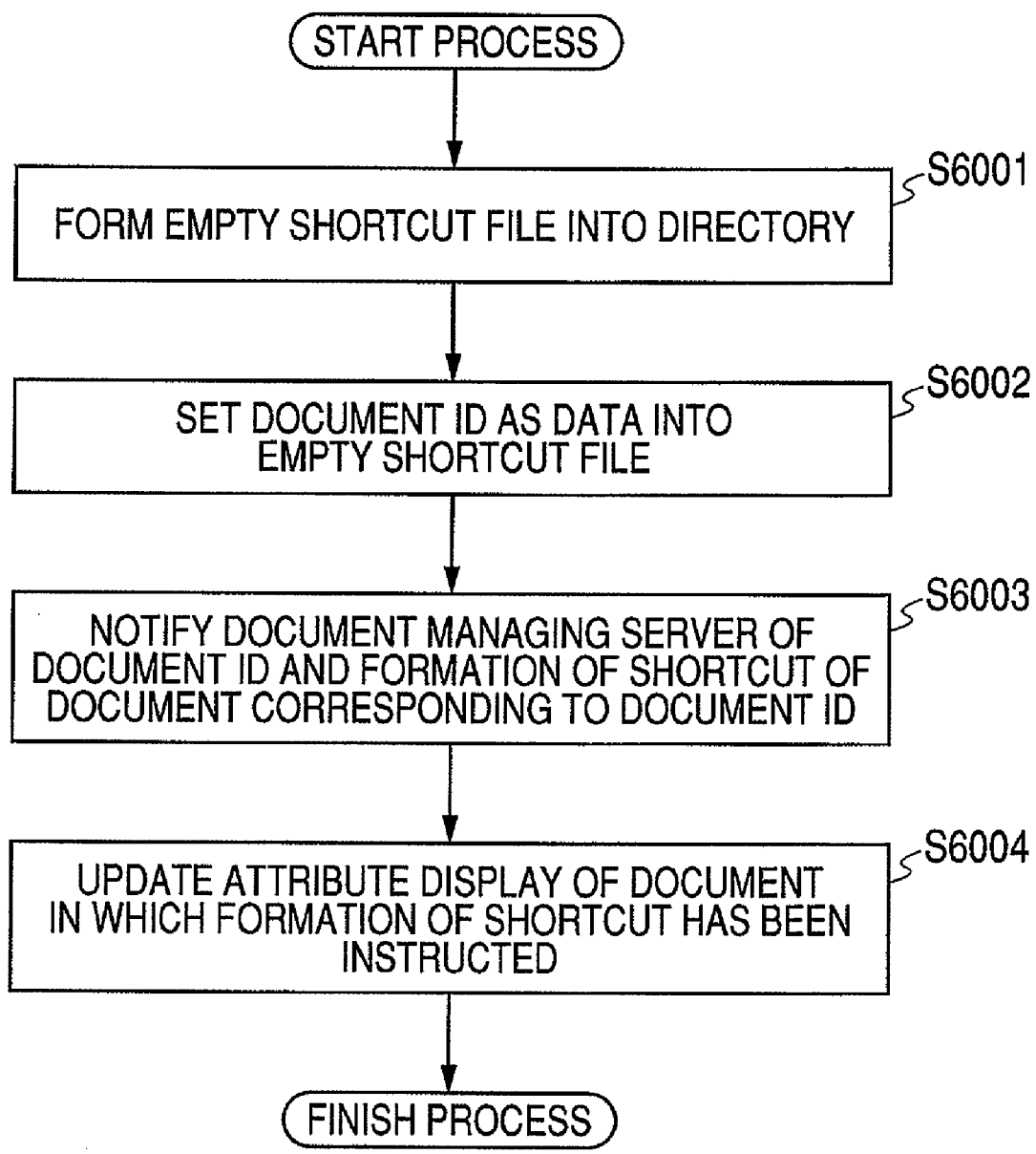

FIG. 16

| ITEM | VALUE |
|---|---|
| DOCUMENT NAME | PROXY – DOCUMENT C |
| VOLUME DATA ID | |
| SIZE | |
| THE NUMBER OF PAGES | |
| DOCUMENT TYPE | PROXY ENTITY |
| VERSION NUMBER | 1 |
| OWNER ID | 039872 |
| ACCESSING RIGHT | DELETE |
| FORMING TIME/DATE | 11/08/2007 22:34:15 |
| UPDATING TIME/DATE | 11/08/2007 22:34:15 |
| ACCESSING TIME/DATE | 11/08/2007 22:34:15 |
| UNREAD/ALREADY-READ STATE | UNREAD |
| CHECK-OUT STATE | NO |
| SHORTCUT FORMATION HISTORY | |
| PROXY ENTITY | 10001 |
| COMMENTS | |
| ⋮ | ⋮ |

FIG. 17

| ITEM | 5100 | VALUE | 5200 |
|---|---|---|---|
| 5101 — DOCUMENT NAME | | DOCUMENT C | |
| 5102 — VOLUME DATA ID | | VOLUME897871 | |
| SIZE | | 514905 | |
| THE NUMBER OF PAGES | | | |
| 5103 — DOCUMENT TYPE | | PDF | |
| VERSION NUMBER | | 38 | |
| 5104 — OWNER ID | | 002978 | |
| ACCESSING RIGHT | | DELETE | |
| FORMING TIME/DATE | | 01/02/2007 12:38:34 | |
| UPDATING TIME/DATE | | 07/08/2007 09:23:01 | |
| ACCESSING TIME/DATE | | 11/08/2007 22:34:15 | |
| UNREAD/ALREADY-READ STATE | | ALREADY-READ | |
| CHECK-OUT STATE | | NO | |
| 5105 — SHORTCUT FORMATION HISTORY | | 1 | |
| 5106 — PROXY ENTITY | | 53247 | ~18001 |
| 5107 — COMMENTS | | | |
| ⋮ | | ⋮ | |

DOCUMENT MANAGEMENT SYSTEM, DOCUMENT MANAGEMENT METHOD, AND COMPUTER PROGRAM FOR FORMING PROXY DATA FOR DELETED DOCUMENTS

BACKGROUND OF THE INVENTION

1. Field of the Invention

The present invention relates to a document managing system, a document managing method, and a computer program and, more particularly, is suitable for use in formation of a shortcut of a document.

2. Description of the Related Art

In a file system, there is a function called "shortcut". According to the shortcut, an access to a file or a directory on the file system is not directly performed to a substance of the file or directory but is performed through an indirect file. Such a file as to indirectly provide the access to the file is called a shortcut file. As actual examples of the shortcut in the file system, "Shortcut" in Windows (registered trademark) of Microsoft Corporation, "Symbolic-link" in UNIX (registered trademark) of AT & T Corporation, and the like can be mentioned. Each of those shortcut functions is often called by a name peculiar to an operating system (OS) for controlling the file system.

In the file system, there is a function which is what is called "trash box". It is a special directory for holding the deleted unnecessary files and directories and enables them to be reconstructed by an instruction of the user.

In recent years, functions equivalent to the shortcut and the trash box are also provided by a document managing system which uses a database as a backend engine. The file and the directory in the file system correspond to a document and a folder in the document managing system, respectively. When the file in the file system is moved to another directory or is moved to the trash box due to a deletion, the shortcut which has been set for an original path of such a file cannot be used. This is because since the substance of the file has been moved, path information which is stored into the shortcut file does not indicate a proper existing location of the substance of the file.

A technique in the related art to solve such a problem has been disclosed in Japanese Patent Laid-Open No. H08-161210. According to the technique disclosed in Japanese Patent Laid-Open No. H08-161210, when the position of the substance of the file as a link destination of the shortcut file is changed, a file called "temporary file" describing the position of a movement destination is formed by the same file name as that of the file on the link destination. When the temporary file is accessed from the shortcut file, the shortcut is notified of the position of the substance of the file after the movement, and the path information held in the shortcut file is changed to new path information.

However, according to the shortcut in the document managing system, there is a case where such a related art does not become a proper solving device. In the document managing system, the document is managed by a document management ID corresponding to an entry of the database. Therefore, in the shortcut in the document managing system, information of the document management ID is held instead of the path information of the shortcut in the file system. Since the document is accessed from the shortcut by the document management ID, even if the document is moved to the trash box or the like, the document after the movement can be accessed from the shortcut. Therefore, in such a case, the foregoing related art is unnecessary.

However, even in the document managing system, there is a case where the file called "temporary file" which is used in the foregoing related art is necessary. That is, it is necessary when the documents are exchanged. There is a case where after the document was temporarily deleted, the user wants to exchange the documents. If the shortcut of the document has already been formed prior to exchanging, the deleted document becomes an access destination of the shortcut. Even if the document is newly registered by the same document name after the document was deleted, the access destination of the shortcut does not become the document. Such a result is undesirable to the user who performed the exchange.

For example, in a work flow such as an approval request of the document, after the document was registered, a shortcut is formed and attached to E-mail, and the E-mail for the approval request is transmitted to the approver. In this case, the document shown by the shortcut attached to the E-mail is a document as a target of the approval request. There is a case where after the E-mail was transmitted, since the registered document is a wrong document, the requester wants to exchange the document. In this instance, there is a case where the user temporarily deletes the document and exchanges the document. In the case where he has executed such an exchanging operation that after the document was deleted, a new document is registered, in the related art, it is necessary to form again a shortcut for the document obtained after the exchange and transmit E-mail for the approval request again to the approver. This is because the document management ID of the document before the exchange and the document management ID of the document obtained after the exchange differ. That is, since the shortcut which has been attached to the E-mail and transmitted before holds the document management ID of the document before the exchange, unless the shortcut for the document obtained after the exchange is formed again and the E-mail for the approval request is transmitted again, the approver cannot open the document obtained after the exchange.

At the time of the document exchange as mentioned above, a check-in/check-out function of the document of the document managing system can be also used. In the case of using such a function, since the document management ID is not changed, there is no need to change the shortcut. However, the check-in/check-out function is generally a function which intends to update the same type of document and is not suitable to such a case that the document type is changed and the document is exchanged.

SUMMARY OF THE INVENTION

The invention is made in consideration of the above problems and it is an object of the invention that when a document whose shortcut has been set is exchanged by another document, the shortcut for the document before the exchange can effectively act on the document obtained after the exchange.

According to the invention, there is provided a document managing system comprising: a shortcut forming unit that forms a shortcut of a document, the shortcut including a document ID of the document set therein; a proxy data forming unit that, when a deletion of the document whose shortcut has been formed is instructed, forms proxy data of the document into a same folder as that of the document, the proxy data including the document ID of the document set therein; and a moving unit that changes the document ID of the document whose deletion has been instructed to another document ID and moves the document whose document ID has been changed into a predetermined storing area for holding unnecessary data.

According to the invention, by using the proxy data in which the document ID of the deleted document has been set, the shortcut of the document before the exchange is enabled to effectively act on the document obtained after the exchange.

Further features of the present invention will become apparent from the following description of exemplary embodiments with reference to the attached drawings.

BRIEF DESCRIPTION OF THE DRAWINGS

FIG. 3 illustrates the embodiment of the invention and is a diagram conceptually illustrating an example of a data structure of a user information table registered in the attribute database.

FIG. 4 illustrates the embodiment of the invention and is a diagram illustrating an example of data items in a document attribute information registered in the attribute database.

FIG. 5 illustrates the embodiment of the invention and is a flowchart for describing an example of processes of a terminal of a document management client at the time of forming a shortcut of a document.

FIG. 16 illustrates the embodiment of the invention and is a diagram illustrating an example of "values of data items of document attribute information of the proxy entity" which are registered into the attribute database.

FIG. 17 illustrates the embodiment of the invention and is a diagram illustrating an example of "values of data items of document attribute information of the deletion document in which the proxy entity has been formed" which have been registered in the attribute database.

DESCRIPTION OF THE EMBODIMENTS

An embodiment of the invention will be described hereinbelow with reference to the drawings.

Figure 1:
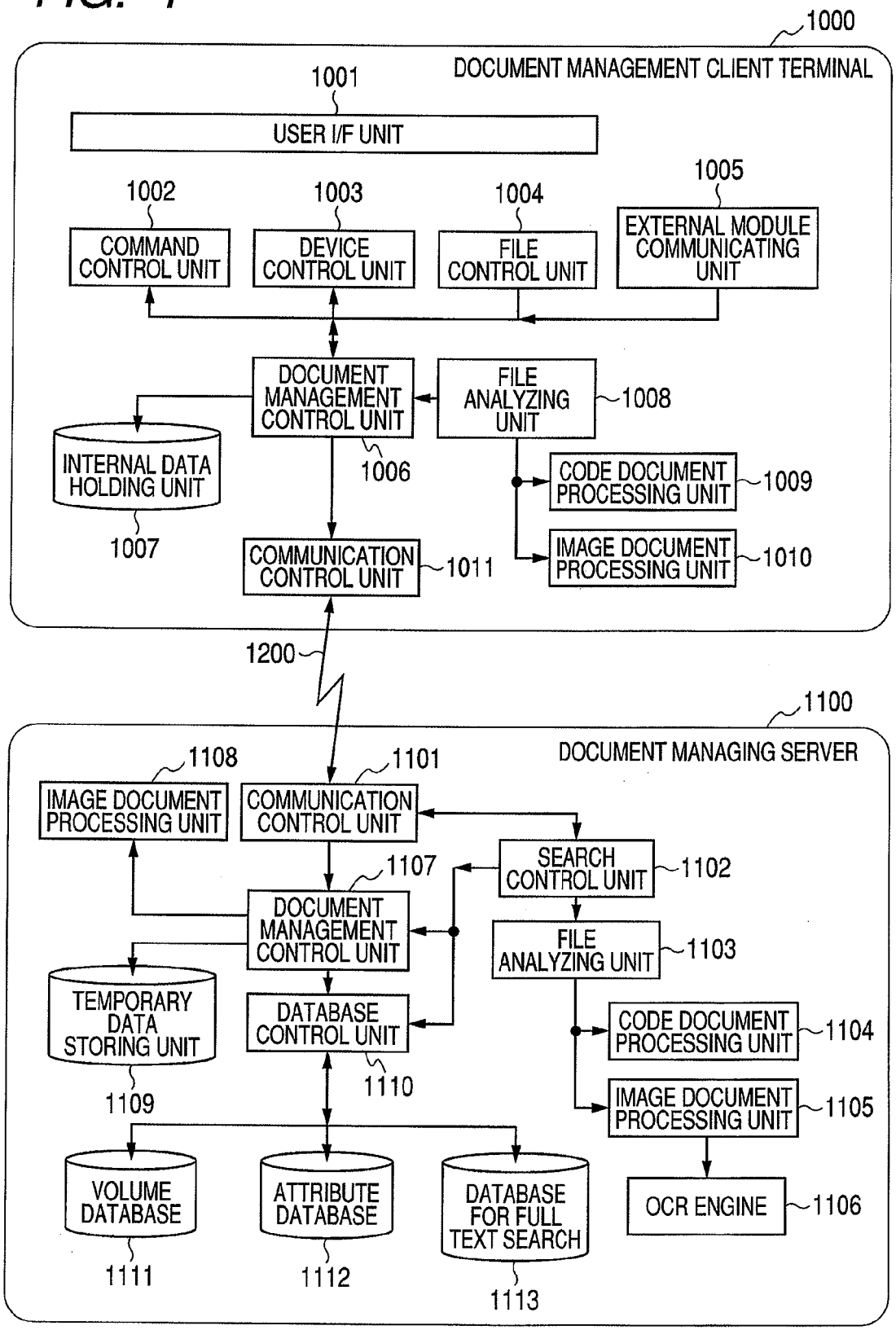
FIG. 1 illustrates an embodiment of the invention and is a diagram illustrating an example of a construction of a document managing system.

FIG. 1 is a diagram illustrating an example of a construction of a document managing system. The document managing system in the embodiment has "a document management client terminal 1000 and a document managing server 1100" which operate, for example, on an OS of a personal computer. In the embodiment, a document managing system for fetching a document from a device such as a scanner or a file system of the OS and managing the document by a plurality of users will be described as an example.

<Document Input/output Processing Unit>

First, a "processing unit for executing an input/output of the document and the operation" in the document management client terminal 1000 will be described.

The user executes the operation such as registration of the document into the document managing server 1100, acquisition of the document from the document managing server 1100, or search for the document through a user interface (user I/F) unit 1001. The operation such as deletion of the document, instruction to an inquiry dialog regarding a proxy entity, movement of the document from a trash box, or setting of a message to the proxy entity is also executed in the user interface unit 1001.

Information of the operation executed to the user interface unit 1001 is analyzed by a command control unit 1002 and a proper process is executed. If necessary, a command for communicating with the document managing server 1100 is formed by the command control unit 1002.

The device such as a scanner or the like is controlled by a device control unit 1003. For example, the device control unit 1003 executes a process for fetching document data from the device side or receiving the data which is transmitted from the device side.

A file stored in the OS such as a file system or the like can be input-processed by a file control unit 1004 in such a form as to import the document data. A process for exporting the file which is managed by the document managing server 1100 into the OS is also executed in the file control unit 1004.

An external module communicating unit 1005 communicates with an external application and executes a process for transmitting the document in the document managing server 1100 to the external application or receiving the document from the external application. For example, a process for transmitting the document which is managed by the document managing server 1100 to a mailer corresponding to, for example, an MAPI (Messaging Application Program Interface) or the like is executed in the external module communicating unit 1005.

<Processing Units in Document Management Client>

Subsequently, various kinds of processing units which are arranged in the document management client terminal 1000 will be described.

A document management control unit 1006 is the heart of the document management client terminal 1000. The document management control unit 1006 executes a process according to an image or a command transmitted from an input/output processing unit (not shown).

An internal data holding unit 1007 holds temporary data and the like. For example, the internal data holding unit 1007 temporarily stores data which is formed in a step of executing an image process, data which is formed in a step of communicating with the document managing server 1100, or the like.

A file analyzing unit 1008 discriminates whether or not the registered document is a document which can be handled as an image. If the registered document is the document which can be handled as an image, an image process is executed as necessary by an image document processing unit 1010. If the registered document is a code document which cannot be handled as an image, a process is executed in a code document processing unit 1009. Although a process is hardly executed to the code document in the document managing server 1100, a process for forming a thumbnail for the code document, a process for obtaining document attributes, or the like is executed in the code document processing unit 1009.

A communication control unit 1011 makes control for communication with the document managing server 1100 through a communication path 1200 such as LAN, Internet, or the like. In the embodiment, the communication control unit 1011 makes only control that is limited to the processes of the document managing server 1100 and another control unit prepared for the OS is used for control of the communication itself such as TCP/IP or the like.

<Processing Units in Document Managing Server>

Subsequently, various kinds of processing units which are arranged in the document managing server 1100 will be described.

A communication control unit 1101 makes control for communication with the communication control unit 1011 of the document management client terminal 1000 through the communication path 1200. The communication control unit 1101 of the document managing server 1100 can simultaneously communicate with the communication control units 1011 of a number of document management client terminals 1000.

A search control unit 1102 executes a searching process according to a request from the document management client terminal 1000 or a process for forming an index to search for the registered document.

Main functions of a file analyzing unit 1103, a code document processing unit 1104, and an image document processing unit 1105 are substantially the same as those of the document management client terminal 1000. However, in the document managing server 1100, a process for extracting the index for searching from the document is executed according to the registered document. That is, the file analyzing unit 1103 discriminates the type of registered file. If the type of registered file indicates a code document, the code document processing unit 1104 extracts index data. If the type of registered file indicates an image document, the image document processing unit 1105 executes an image process and an OCR engine 1106 extracts the index data from the image document.

A document management control unit 1107 distributes all processes regarding a document management.

An image document processing unit 1108 executes an image process such as paste of annotation to the image document which is transferred to the document management client terminal 1000, conversion of an image format, or the like.

A temporary data storing unit 1109 stores temporary data and the like of the document managing server 1100 side.

<Database Processing Unit>

A database processing unit in the document managing server 1100 will now be described.

Based on an instruction from the document management control unit 1107, a database control unit 1110 forms data which is stored into a database and holds the corresponding data into any one of a volume database 1111, an attribute database 1112, and a database 1113 for full text search. According to a request from the document management client terminal 1000, the database control unit 1110 extracts the data from each database and forms a document to be transmitted to the document management client terminal 1000.

The volume database 1111 is a database in which the substance of the document is stored. The volume database 1111 is a conceptual expression and its substance may be a file system of the OS.

The attribute database 1112 is a database in which information regarding attributes such as name, forming date, comments, and the like of the document is stored. Management information data such as information of the user who uses the document managing system, an access control table to a keyword, and position information data of a keyword of each document have also been stored in the attribute database 1112.

Data in which text data extracted from the registered document is set to index information is registered in the database 1113 for full text search. When the full text is searched in the document management client terminal 1000, the database 1113 for full text search is searched.

Figure 2:
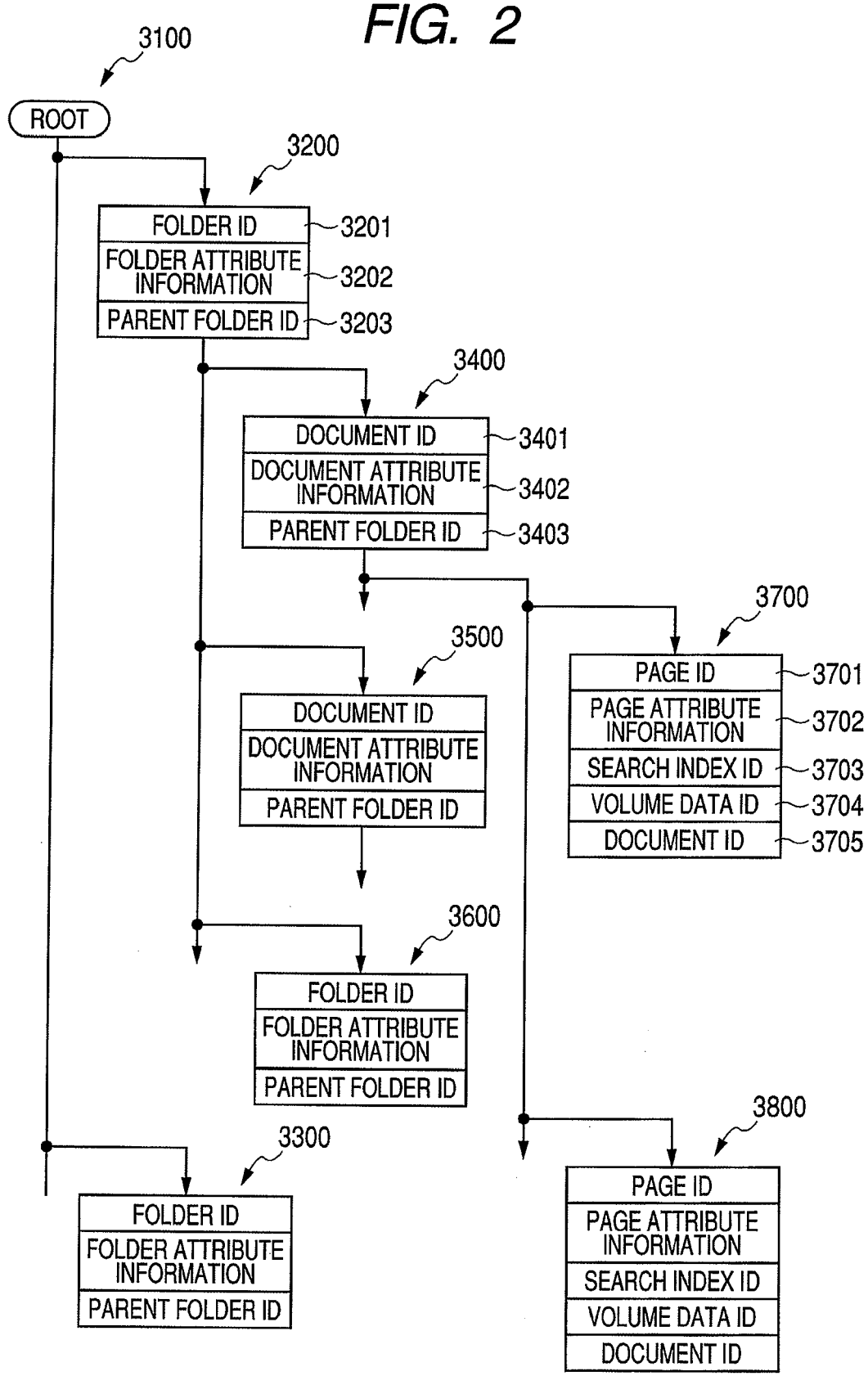
FIG. 2 illustrates the embodiment of the invention and is a diagram conceptually illustrating an example of a data structure of information regarding documents registered in an attribute database.

FIG. 2 is a diagram conceptually illustrating an example of a data structure of the information regarding the documents registered in the attribute database 1112.

In FIG. 2, all entries which are registered are child data of a root 3100 of the attribute database 1112.

A folder entry 3200 is data of a folder for the user to store the data. The folder entry 3200 includes: a folder ID 3201; folder attribute information 3202; and a parent folder ID 3203. Since a plurality of folders can exist under the root 3100, the folders of the number existing at the highest position (under the root 3100) are registered as child data which are connected to positions just under the root 3100. In FIG. 2, the two folders (folder entries 3200 and 3300) are illustrated as an example. As illustrated in FIG. 2, a parent folder of the folders (folder entries 3200 and 3300) existing at the highest position is the root 3100.

The data in the "trash box" also becomes a folder entry and has previously been registered as a folder entry existing at the highest position.

A document entry 3400 exists as child data of a folder in which the document is stored. The document entry 3400 includes a document ID 3401, document attribute information 3402, and a parent folder ID 3403. The document attribute information 3402 includes a plurality of data items such as document name, updating time/date, comment data, and the like. Since a plurality of document entries can exist under the folder, the document entries of the number are registered as child data connected to positions just under the folder entry. In FIG. 2, two documents (document entries 3400 and 3500) are illustrated as an example.

By allowing a folder (folder entry) to further exist under the folder (folder entry), a hierarchical structure of the folders can be obtained. In FIG. 2, a case where a folder entry 3600 has been registered just under the folder entry 3200 is illustrated as an example.

Information regarding each page of the document registered in the folder is stored in a page entry 3700. The page entry 3700 includes: a page ID 3701; page attribute information 3702; a search index ID 3703; a volume data ID 3704; and a document entry ID 3705. The search index ID 3703 is an ID of the information stored in the database 1113 for full text search. The volume data ID 3704 is an ID of the substance of the document registered in the volume database 1111. By using the volume data ID 3704, information regarding the document can be extracted from each database. Information such as page number and file format is stored in the page attribute information 3702. The page entries of the number of pages of the document can be registered as child data connected to positions just under the document entry. In FIG. 2, two pages (two page entries 3700 and 3800) are illustrated as an example.

FIG. 3 is a diagram conceptually illustrating an example of a data structure of a user information table registered in the attribute database 1112.

In FIG. 3, a user information table 4000 is constructed by elements of an ID 4001, a login name (Name) 4002, and properties (Properties) 4003 and manages the users in the document managing system. The ID 4001 is used to distinguish the users and is an unconditional element in the document managing system. The login name 4002 is also used to distinguish the users and is an unconditional element in the document managing system. Information associated with the user as well as a password has been stored in the properties 4003.

FIG. 4 is a diagram illustrating an example of data items in the document attribute information registered in the attribute database 1112.

As illustrated in FIG. 4, a value 5200 is stored into items 5100. A document name 5101, a volume data ID 5102 of the document, a document type 5103, an owner ID 5104, a shortcut formation history 5105, a proxy entity 5106, comments 5107, and the like exist in the items 5100.

<Processes at the Time of Forming Document Shortcut in Document Management Client Terminal>

Figure 6:
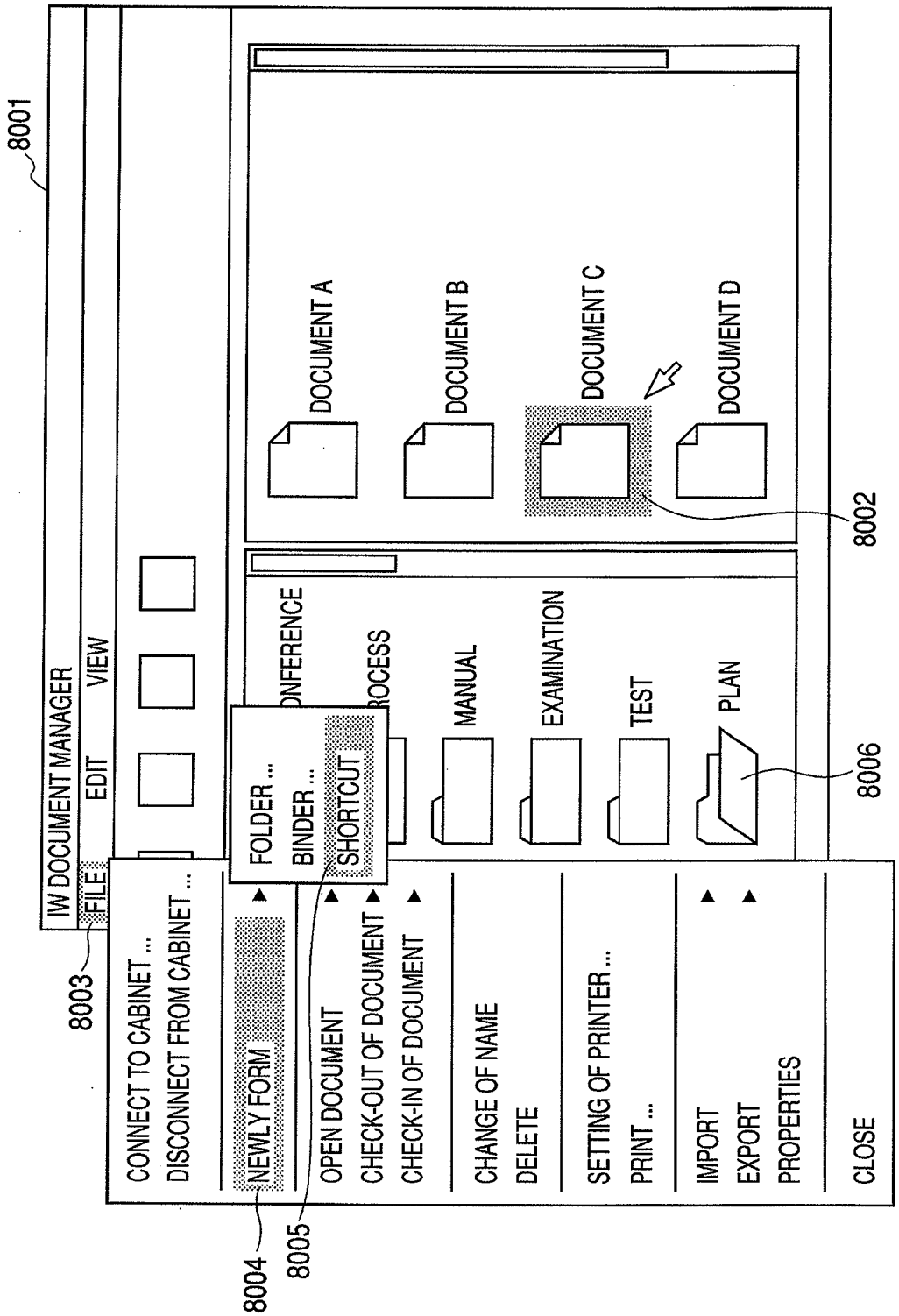
FIG. 6 illustrates the embodiment of the invention and is a diagram illustrating an example of a document shortcut forming menu display screen which is displayed on the terminal of the document management client.

First, an example of processes at the time of forming a shortcut of the document on the document management client terminal 1000 side will be described. FIG. 5 is a flowchart for describing an example of processes of the document management client terminal 1000 at the time of forming the shortcut of the document. FIG. 6 is a diagram illustrating an example of a document shortcut forming menu display screen which is displayed on the document management client terminal 1000.

As illustrated in FIG. 6, the user selects a document 8002 from a user interface 8001 of the user interface unit 1001 and, further, selects a shortcut 8005 from "newly form" 8004 in a File menu 8003 of the application. Thus, a formation of a shortcut of the document 8002 is instructed. An arbitrary directory in the file system of the OS is designated as a forming destination of the shortcut.

After the formation of the shortcut was instructed by the user, the document management client terminal 1000 starts the process for forming the shortcut of the document 8002 in a folder 8006.

In step S6001 in FIG. 5, the document management control unit 1107 forms an empty shortcut file into the designated directory.

Figure 7:
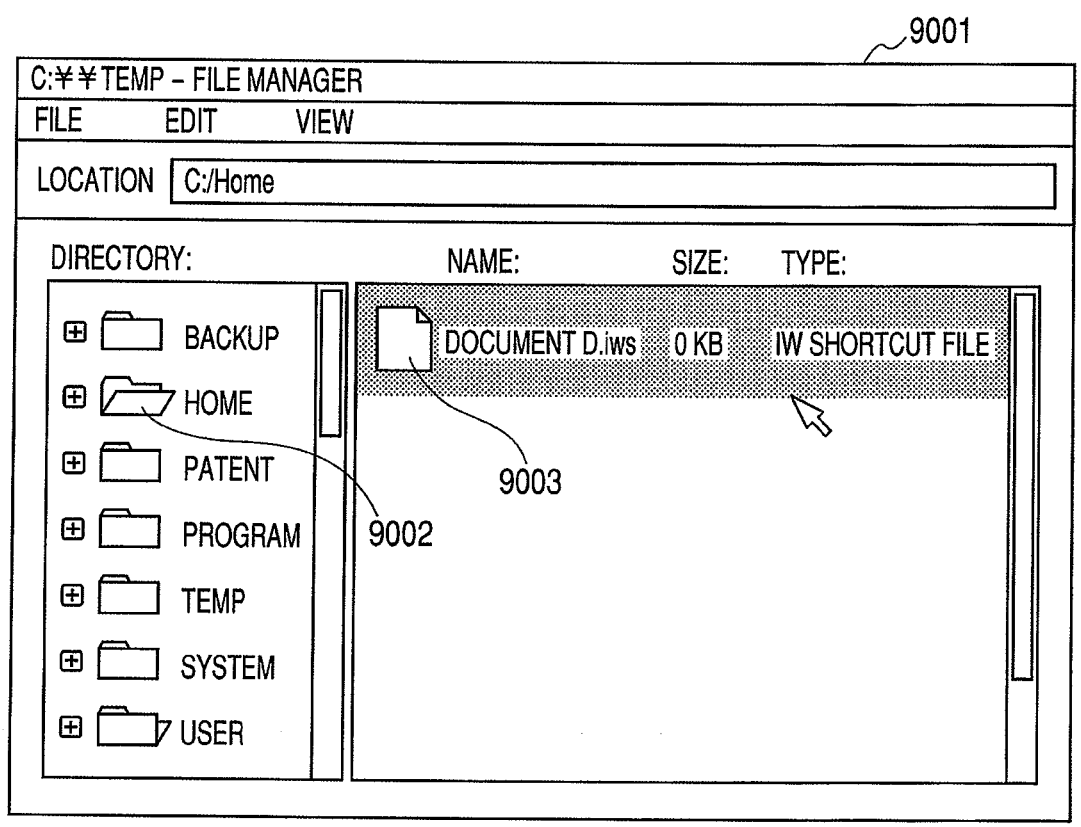
FIG. 7 illustrates the embodiment of the invention and is a diagram illustrating an example of a display of an application such as a file manager or the like which displays data in a file system.

FIG. 7 is a diagram illustrating an example of a display of an application 9001 such as a file manager or the like which displays the data of the file system. In the example illustrated in FIG. 7, a shortcut file 9003 is formed in a directory 9002.

Subsequently, in step S6002, the document management control unit 1107 sets a document ID, as data, of the document 8002 in which the formation of the shortcut has been instructed into the empty shortcut file formed in step S6001.

As mentioned above, in the embodiment, for example, an example of a shortcut forming unit is realized by executing the processes in steps S6001 and S6002.

Subsequently, in step S6003, the communication control unit 1011 notifies the document managing server 1100 of the document ID set in step S6002 and that the shortcut of the document 8002 corresponding to the document ID has been formed.

Subsequently, in step S6004, the document management control unit 1107 updates the display of the attributes of the document 8002 in which the formation of the shortcut has been instructed.

Figure 8:
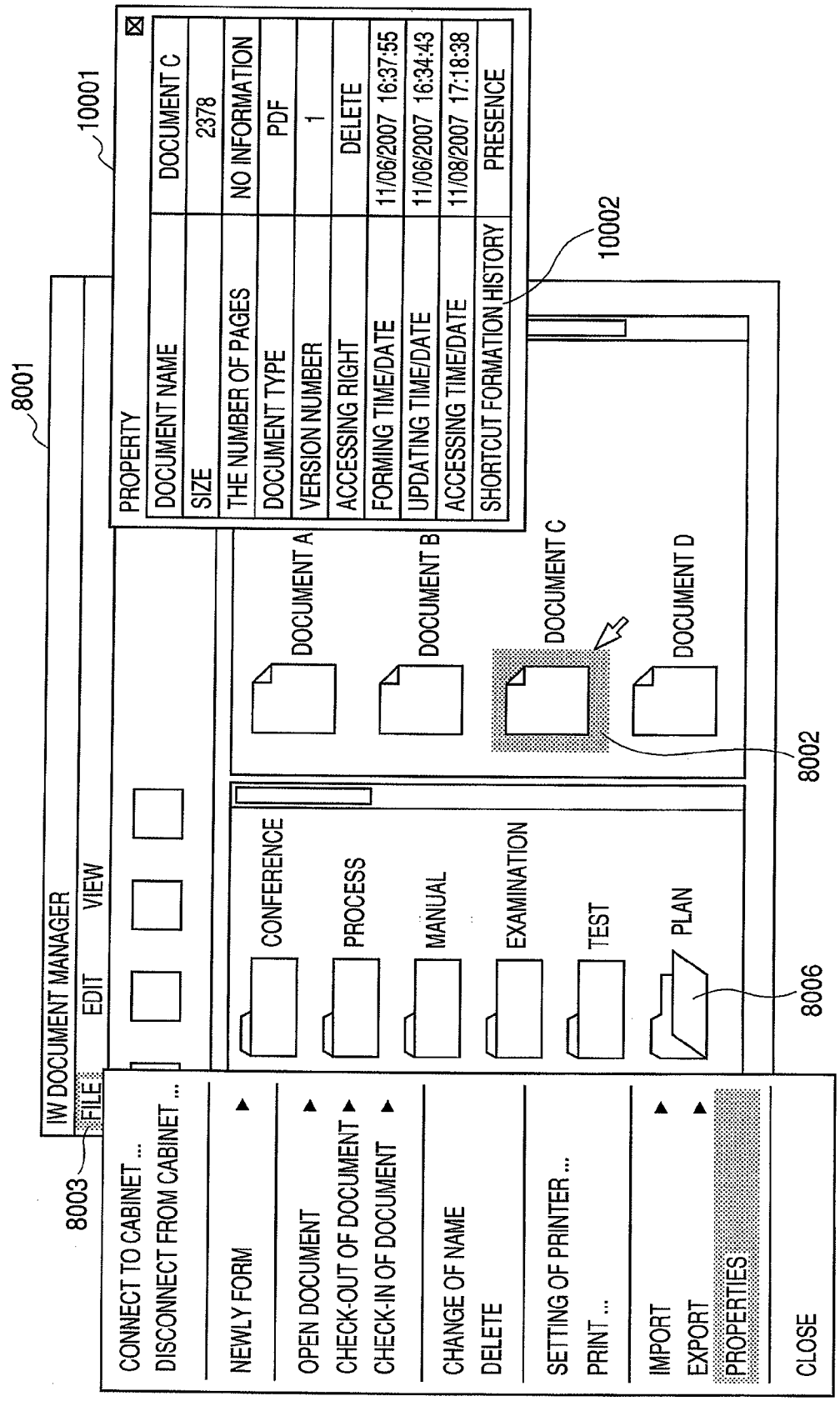
FIG. 8 illustrates the embodiment of the invention and is a diagram illustrating an example of "a property display screen after forming the shortcut of the document" which is displayed on the document management client terminal.

FIG. 8 is a diagram illustrating an example of "a property display screen after forming the shortcut of the document" which is displayed on the document management client terminal 1000.

As illustrated in FIG. 8, a property display 10002 of a shortcut formation history of a property window 10001 has been updated to "presence".

An example of the processes of the document management client terminal 1000 at the time of forming the shortcut of the document has been described above.

<Processes at the Time of Forming Document Shortcut in Document Managing Server>

Figure 9:
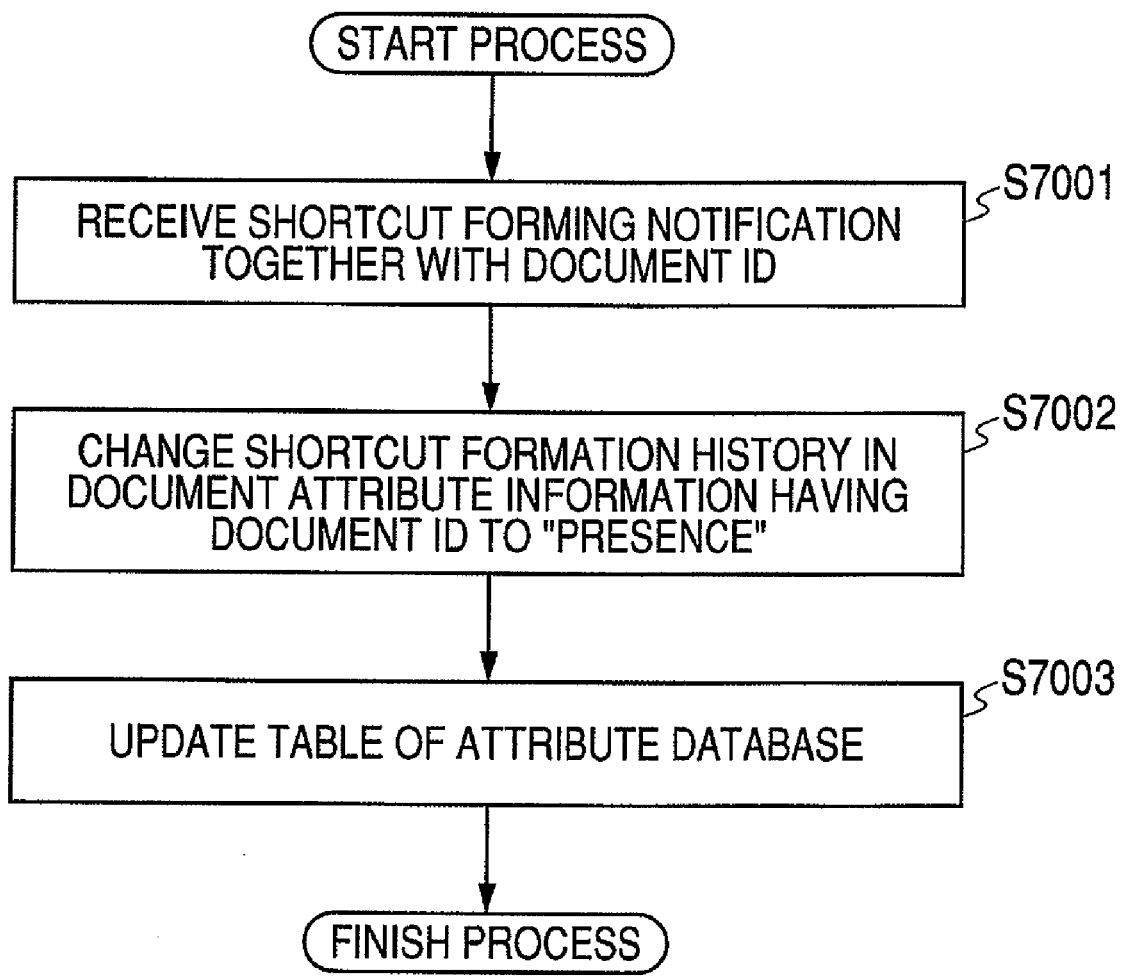
FIG. 9 illustrates the embodiment of the invention and is a flowchart for describing an example of processes of a document managing server at the time of forming the shortcut of the document.

Subsequently, an example of processes at the time of forming a shortcut of the document on the document managing server 1100 side will be described. FIG. 9 is a flowchart for describing an example of the processes of the document managing server 1100 at the time of forming the shortcut of the document.

In step S7001 in FIG. 9, the communication control unit 1101 receives both of the document ID and a notification showing that the shortcut of the document has been formed from the document management client terminal 1000. In order to allow the document management client terminal 1000 to communicate with the document managing server 1100, it is necessary that the user has already been authenticated in the document managing server 1100. After the user was authenticated, all commands transmitted from the document management client terminal 1000 of the authenticated user become the commands which were made under authority of the authenticated user.

Subsequently, in step S7002, the database control unit 1110 changes the shortcut formation history 5105 of the document attribute information corresponding to the document ID notified from the document management client terminal 1000 to "1" (there is a formation history).

Subsequently, in step S7003, the database control unit 1110 updates the table registered in the attribute database 1112.

An example of the processes of the document managing server 1100 at the time of forming the shortcut of the document has been described above.

<Processes of Document Management Client Terminal at the Time of Deleting Document>

Figure 10:
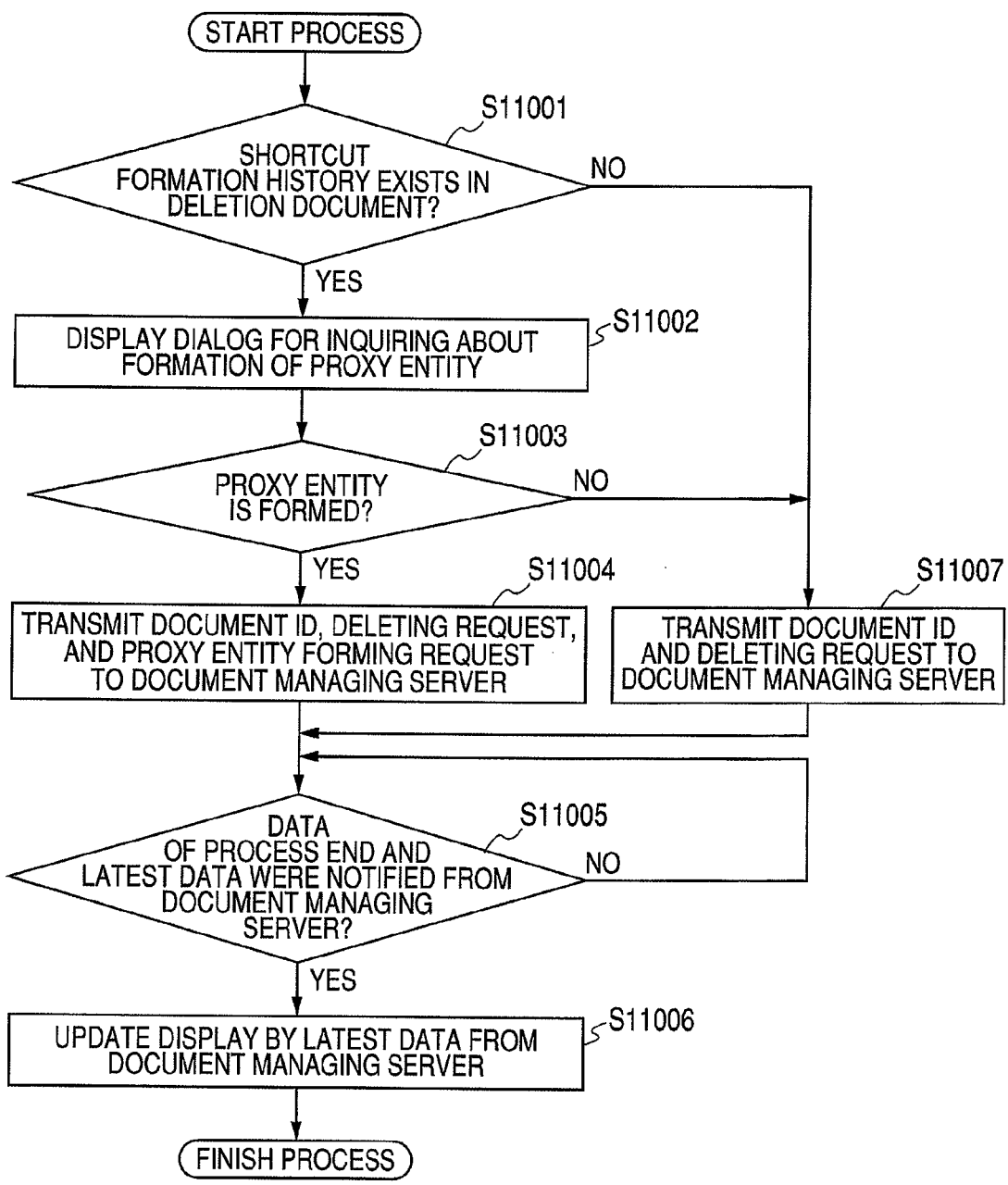
FIG. 10 illustrates the embodiment of the invention and is a flowchart for describing an example of processes of the document management client terminal at the time of deleting the document.
Figure 11:
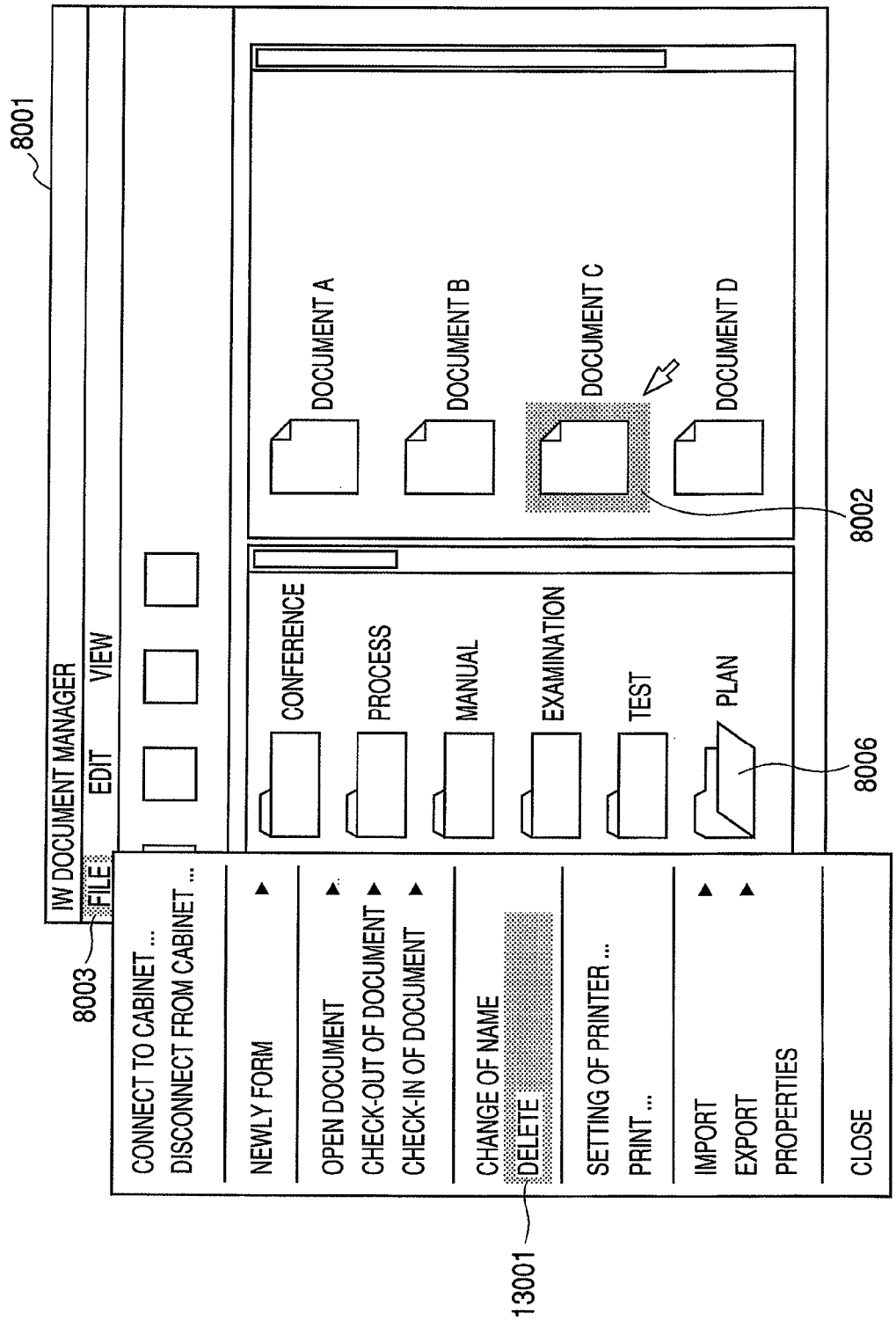
FIG. 11 illustrates the embodiment of the invention and is a diagram illustrating an example of a document deleting menu display screen which is displayed on the document management client terminal.

First, an example of processes of the document management client terminal 1000 side at the time of deleting the document will be described. FIG. 10 is a flowchart for describing the example of processes of the document management client terminal 1000 at the time of deleting the document. FIG. 11 is a diagram illustrating an example of a document deleting menu display screen which is displayed on the document management client terminal 1000.

As illustrated in FIG. 11, the user selects the document 8002 from the user interface 8001 of the user interface unit 1001 and, further, selects "delete" 13001 in the File menu 8003 of the application. Thus, a deletion of the document 8002 is instructed.

After the deletion of the document was instructed by the user, the document management client terminal 1000 starts the process for deleting the document 8002.

In step S11001 in FIG. 10, the document management control unit 1006 discriminates whether or not the shortcut formation history in the document attribute information of the document 8002 whose deletion has been designated is equal to "1", that is, whether or not the shortcut formation history indicates "presence". Such a discrimination can be made, for example, by a method whereby the document management client terminal 1000 inquires of the document managing server 1100 about the contents of the shortcut formation history 5105 in the attribute database 1112.

If it is determined as a result of the discrimination that the shortcut formation history exists in the document 8002 whose deletion has been designated, step S11002 follows. When the processing routine advances to step S11002, the document management control unit 1006 displays a dialog for inquiring whether or not a proxy entity is formed (a proxy entity formation inquiry dialog at the time of deleting the document) to the user interface unit 1001.

Figure 12:
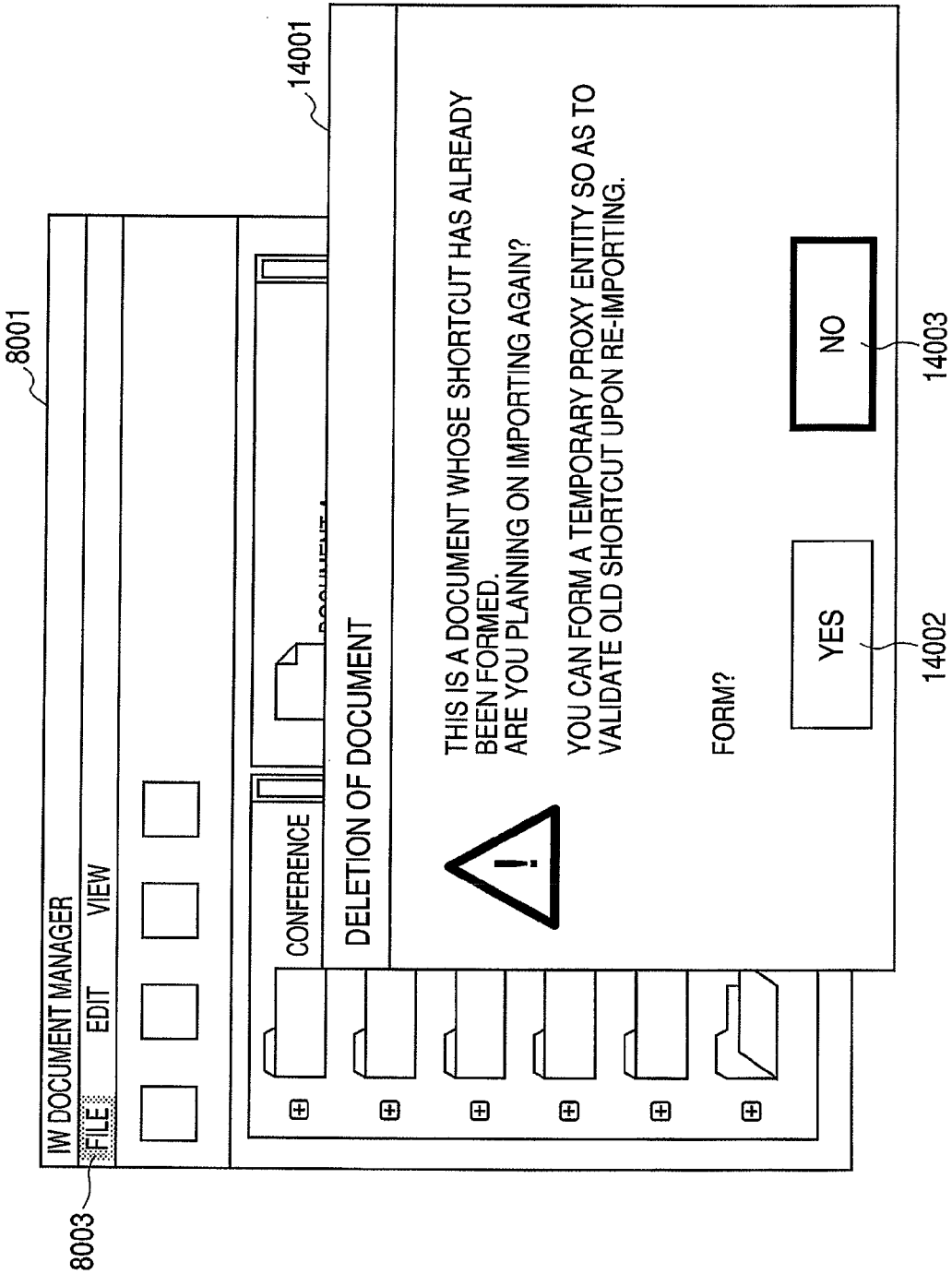
FIG. 12 illustrates the embodiment of the invention and is a diagram illustrating an example of a proxy entity formation inquiry dialog at the time of deleting the document.

FIG. 12 is a diagram illustrating an example of a proxy entity formation inquiry dialog 14001 at the time of deleting the document.

In FIG. 12, a button 14002 is used for the user to instruct that the proxy entity is formed. A button 14003 is used for the user to instruct that the proxy entity is not formed.

As mentioned above, in the embodiment, for example, an example of an inquiry unit is realized by executing the process of step S11002.

Returning to a description of FIG. 10, in step S11003, the document management control unit 1006 discriminates whether or not the proxy entity is formed based on a result of the user's operation to the proxy entity formation inquiry dialog 14001 at the time of deleting the document.

If the proxy entity is formed as a result of the discrimination, step S11004 follows. When the processing routine advances to step S11004, the communication control unit 1011 transmits the document ID of the document 8002 whose deletion has been designated, a deleting request of the document 8002, and a forming request of the proxy entity corresponding to the document 8002 to the document managing server 1100.

Subsequently, in step S11005, the communication control unit 1011 waits until data showing a process end and latest data are received from the document managing server 1100.

When the data showing the process end and the latest data are received from the document managing server 1100, step S11006 follows. When the processing routine advances to step S11006, the document management control unit 1006 updates the display of the user interface 8001 of the user interface unit 1001 based on the received latest data.

Figure 13:
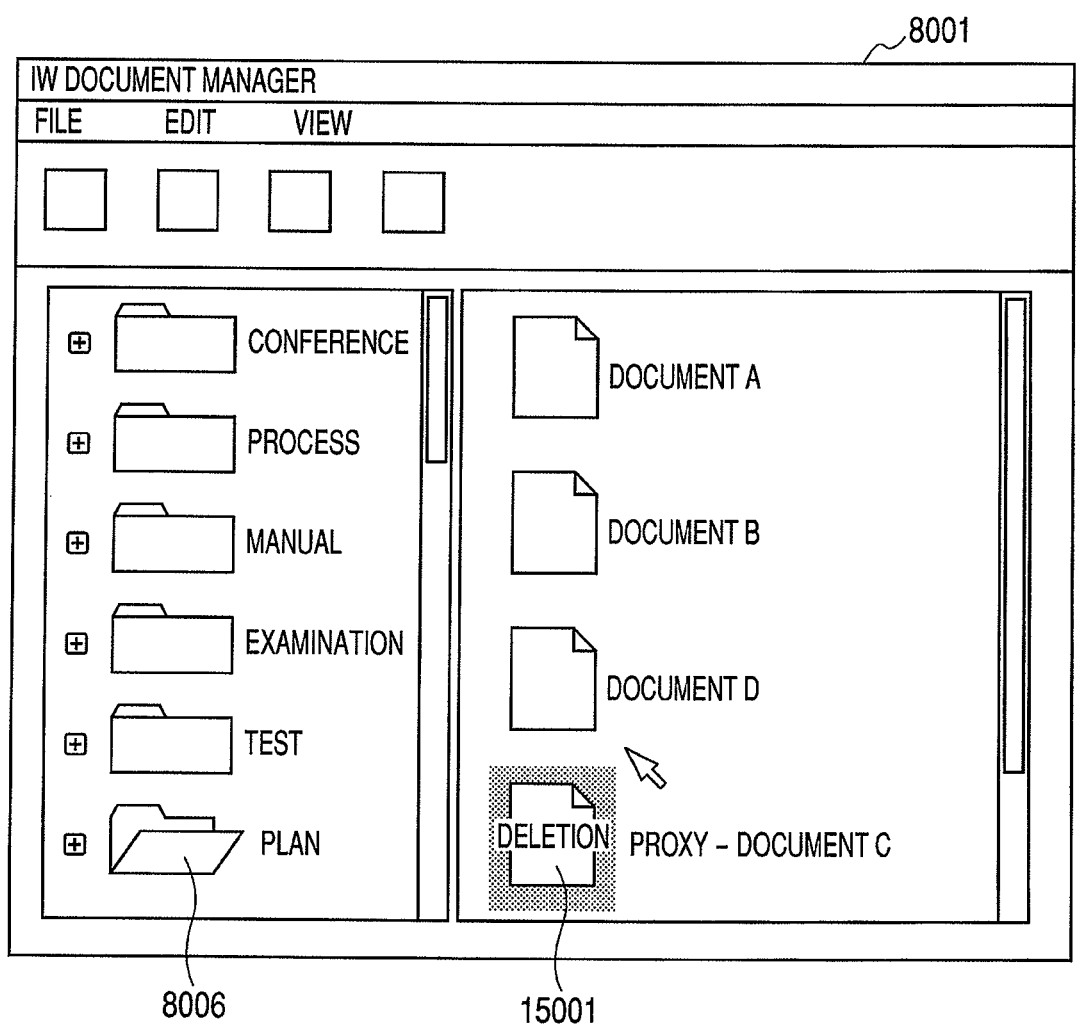
FIG. 13 illustrates the embodiment of the invention and is a diagram illustrating an example of "a document list display screen after the proxy entity was formed" which is displayed on the document management client terminal.

FIG. 13 is a diagram illustrating an example of "a document list display screen after the proxy entity was formed" which is displayed on the document management client terminal 1000.

As illustrated in FIG. 13, a proxy entity 15001 which was newly formed is displayed in place of the document 8002 illustrated in FIG. 11.

Figure 14:
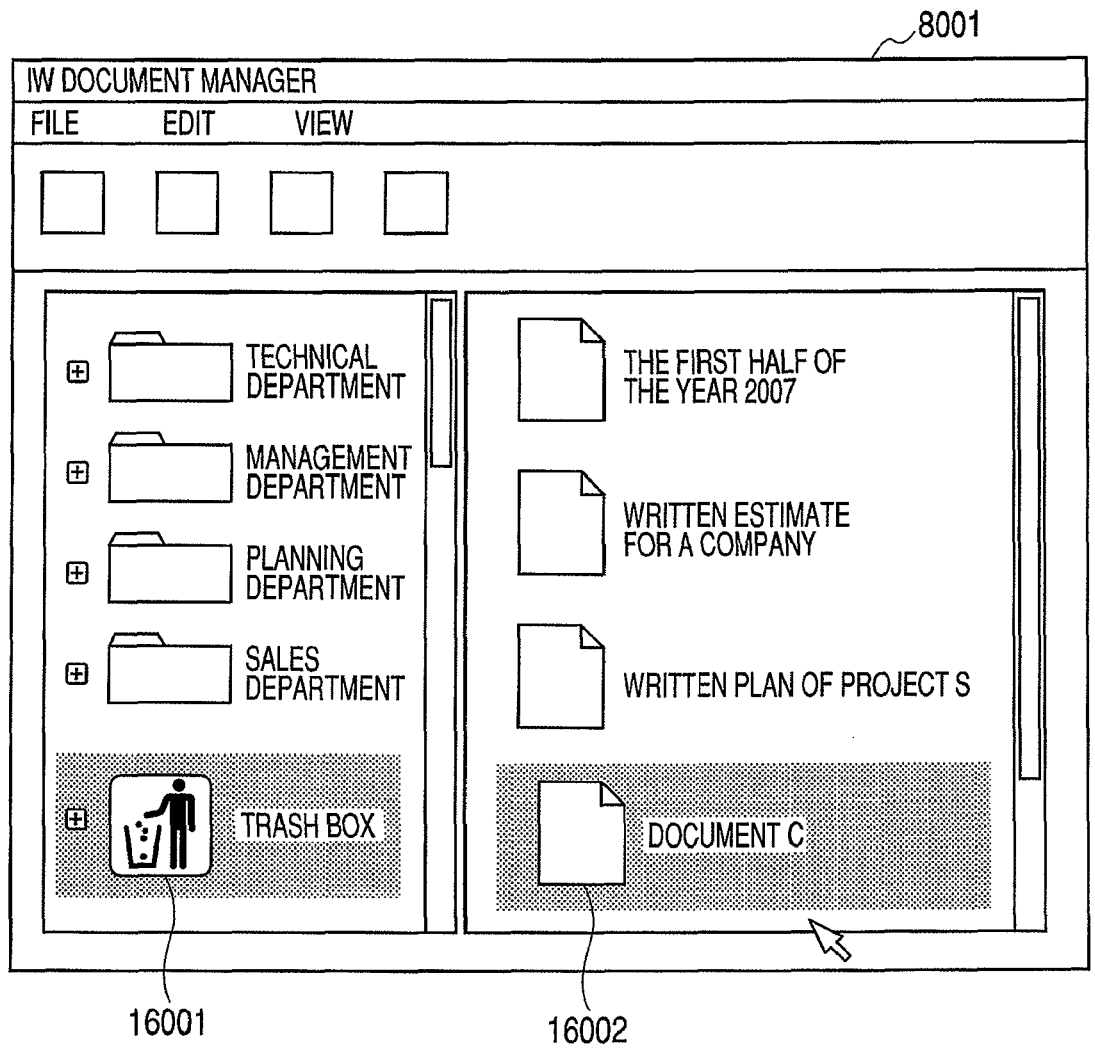
FIG. 14 illustrates the embodiment of the invention and is a diagram illustrating an example of "a list display screen of a deletion document in a trash box after the proxy entity was formed" which is displayed on the document management client terminal.

FIG. 14 is a diagram illustrating an example of "a list display screen of a deletion document in a trash box after the proxy entity was formed" which is displayed on the document management client terminal 1000.

As illustrated in FIG. 14, a deletion document 16002 in which the proxy entity was formed is displayed in a trash box 16001.

As mentioned above, in the embodiment, for example, an example of a predetermined storing area to store unnecessary data is realized by the trash box.

Returning to a description of FIG. 10, in step S11001, if the shortcut formation history in the document attribute information of the document 8002 whose deletion has been designated is equal to "0", that is, if it is determined that the shortcut formation history indicates "absence", step S11007 follows. When the processing routine advances to step S11007, the communication control unit 1011 transmits the document ID of the document 8002 whose deletion has been designated and the deleting request of the document to the document managing server 1100. The processing routine advances to step S11005.

If it is decided in step S11003 that proxy entity is not formed as well, the processing routine advances to step S11007. The document ID of the document 8002 whose deletion has been designated and the deleting request of the document are transmitted to the document managing server 1100. The processing routine advances to step S11005 mentioned above.

An example of the process of the document management client terminal 1000 at the time of deleting the document has been described above.

<Processes in Document Managing Server at the Time of Deleting Document>

Figure 15:
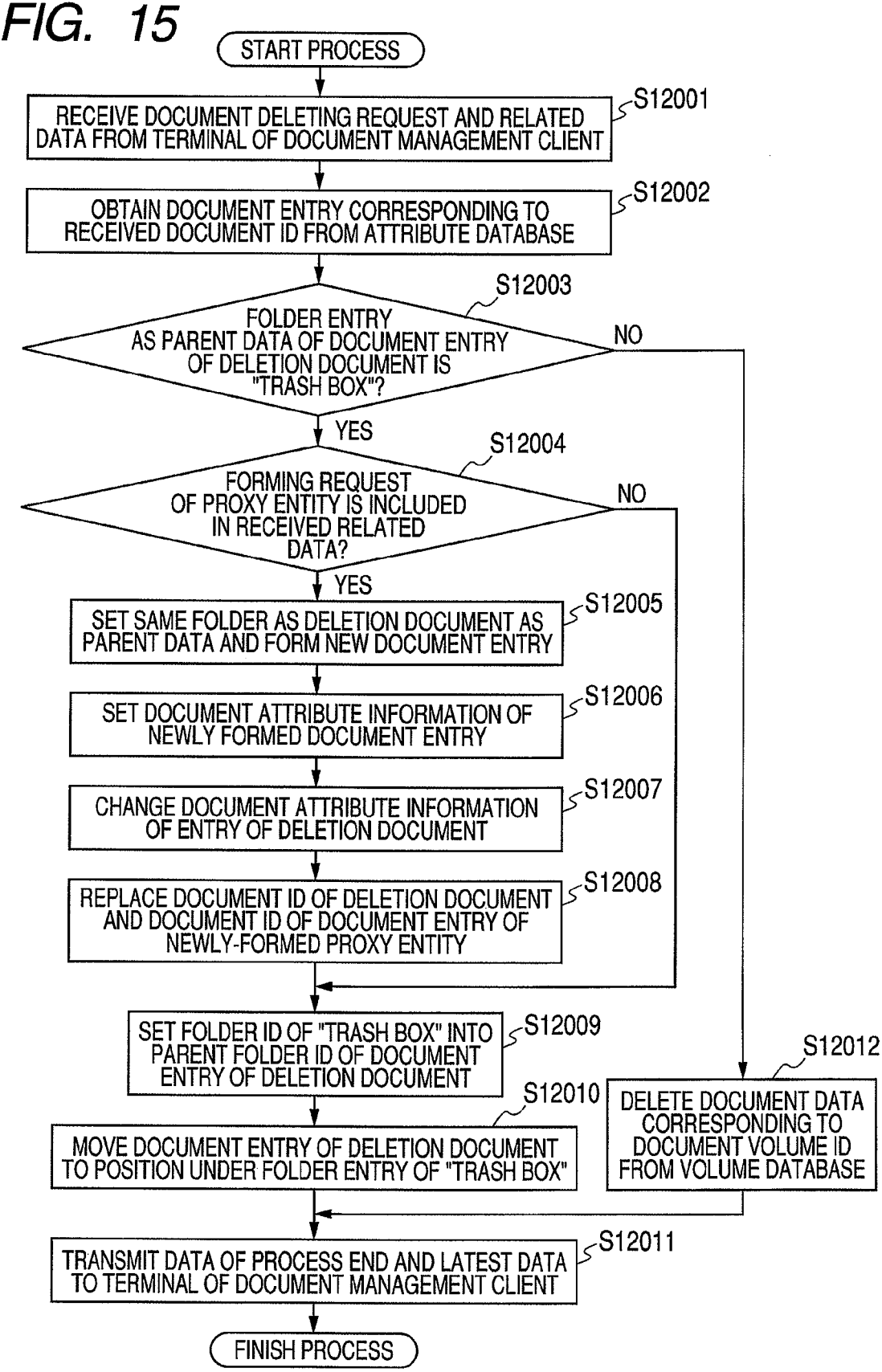
FIG. 15 illustrates the embodiment of the invention and is a flowchart for describing an example of processes of the document managing server at the time of deleting the document.

Subsequently, an example of processes of the document managing server 1100 side at the time of deleting the document will be described. FIG. 15 is a flowchart for describing the example of the processes of the document managing server 1100 at the time of deleting the document.

In step S12001 in FIG. 15, the communication control unit 1101 receives the deleting request of the document 8002 and the data such as a document ID of the document 8002 (deletion document) whose deletion has been instructed and the like from the document management client terminal 1000. In order to allow the document management client terminal 1000 to communicate with the document managing server 1100, it is necessary that the user has already been authenticated in the document managing server 1100. After the user was authenticated, all commands transmitted from the document management client terminal 1000 of the authenticated user become the commands which were made under authority of the authenticated user.

Subsequently, in step S12002, the database control unit 1110 obtains the "document entry of the deletion document" corresponding to the document ID received from the document management client terminal 1000 from the attribute database 1112.

Subsequently, in step S12003, the document management control unit 1107 discriminates whether or not the folder entry as parent data of the "document entry of the deletion document" obtained in step S12002 is the "trash box".

If the folder entry as parent data of the document entry of the deletion document is not the "trash box" as a result of the discrimination, step S12004 follows. When the processing routine advances to step S12004, the document management control unit 1107 discriminates whether or not the forming request of the proxy entity corresponding to the document 8002 whose deletion has been instructed is included in the related data received in step S12001.

If the forming request of the proxy entity corresponding to the document 8002 whose deletion has been instructed is included in the related data received in step S12001 as a result of the discrimination, step S12005 follows. When the processing routine advances to step S12005, the database control unit 1110 sets the folder entry as a "trash box" to the parent data and forms a new document entry (document entry of the proxy entity) into the attribute database 1112.

Subsequently, in step S12006, the database control unit 1110 sets document attribute information of the document entry newly formed in step S12005.

FIG. 16 is a diagram illustrating an example of "values of data items of the document attribute information of the proxy entity" which are registered into the attribute database 1112.

In the example illustrated in FIG. 16, a value obtained by adding "Proxy ~" to the head of the document name "document C" of the document (deletion document) whose deletion has been instructed is set into a value 17001 of the document name 5101. An empty value is set into a value 17002 of the volume data ID 5102 of the document. A "Proxy entity" is set into a value 17003 of the document type 5103. The user ID of the "authenticated user" who instructed the transmission of the deleting request of the document is set into a value 17004 of the owner ID 5104. Further, the present document ID of the "document 8002 whose deletion has been instructed" serving as a proxy is set into a value 17005 of the proxy entity 5106.

Returning to the description of FIG. 15, in step S12007, the database control unit 1110 changes the document attribute information of the document entry of the document 8002 whose deletion has been instructed.

FIG. 17 is a diagram illustrating an example of "values of data items of the document attribute information of the deletion document in which the proxy entity has been formed" which have been registered in the attribute database 1112.

As illustrated in FIG. 17, the document ID of the proxy entity is set into a value 18001 of the proxy entity 5106.

Subsequently, in step S12008, the database control unit 1110 exchanges the document ID of the document 8002 whose deletion has been instructed and the document ID of the document entry of the proxy entity which was newly formed. Thus, as illustrated in FIGS. 16 and 17, the present document ID of the document 8002 whose deletion has been instructed is set into the proxy entity 5106 and the document ID of the proxy entity is set into the document 8002 whose deletion has been instructed.

As mentioned above, in the embodiment, for example, an example of the proxy data is realized by the proxy entity and, further, by executing the processes in steps S12005 to S12008, an example of the proxy data forming unit is realized.

Subsequently, in step S12009, the database control unit 1110 sets the folder ID of the "trash box" into the parent folder ID of the document entry of the document 8002 so that the document entry of the document 8002 whose deletion has been instructed is stored as child data in the "trash box".

Subsequently, in step S12010, the database control unit 1110 moves the "document entry of the deletion document" in which the folder ID of the "trash box" has been set in the parent folder ID to a position under the folder entry.

As mentioned above, in the embodiment, for example, an example of the moving unit is realized by executing the processes in steps S12009 and S12010.

Subsequently, in step S12011, the communication control unit 1101 transmits the data indicative of the end of processes and latest data (for example, the data obtained after it was changed in the flowchart of FIG. 15) to the document management client terminal 1000.

If it is determined in step S12003 that the folder entry as parent data of the "document entry of the deletion document" obtained in step S12002 is the "trash box", step S12012 follows. When the processing routine advances to step S12012, the database control unit 1110 deletes the document data corresponding to the document volume ID of the document attribute information of the "document entry of the deletion document" obtained in step S12002 from the volume database 1111. The processing routine advances to step S12011.

If it is determined in step S12004 that the forming request of the proxy entity corresponding to the document 8002 whose deletion has been instructed is not included in the related data received in step S12001, the processing routine advances to step S12009.

An example of the processes of the document managing server 1100 at the time of deleting the document has been mentioned above.

<Processes in Document Management Client Terminal at the time when Document has Been Registered into Folder in Which Proxy Entity Exists>

Figure 18:
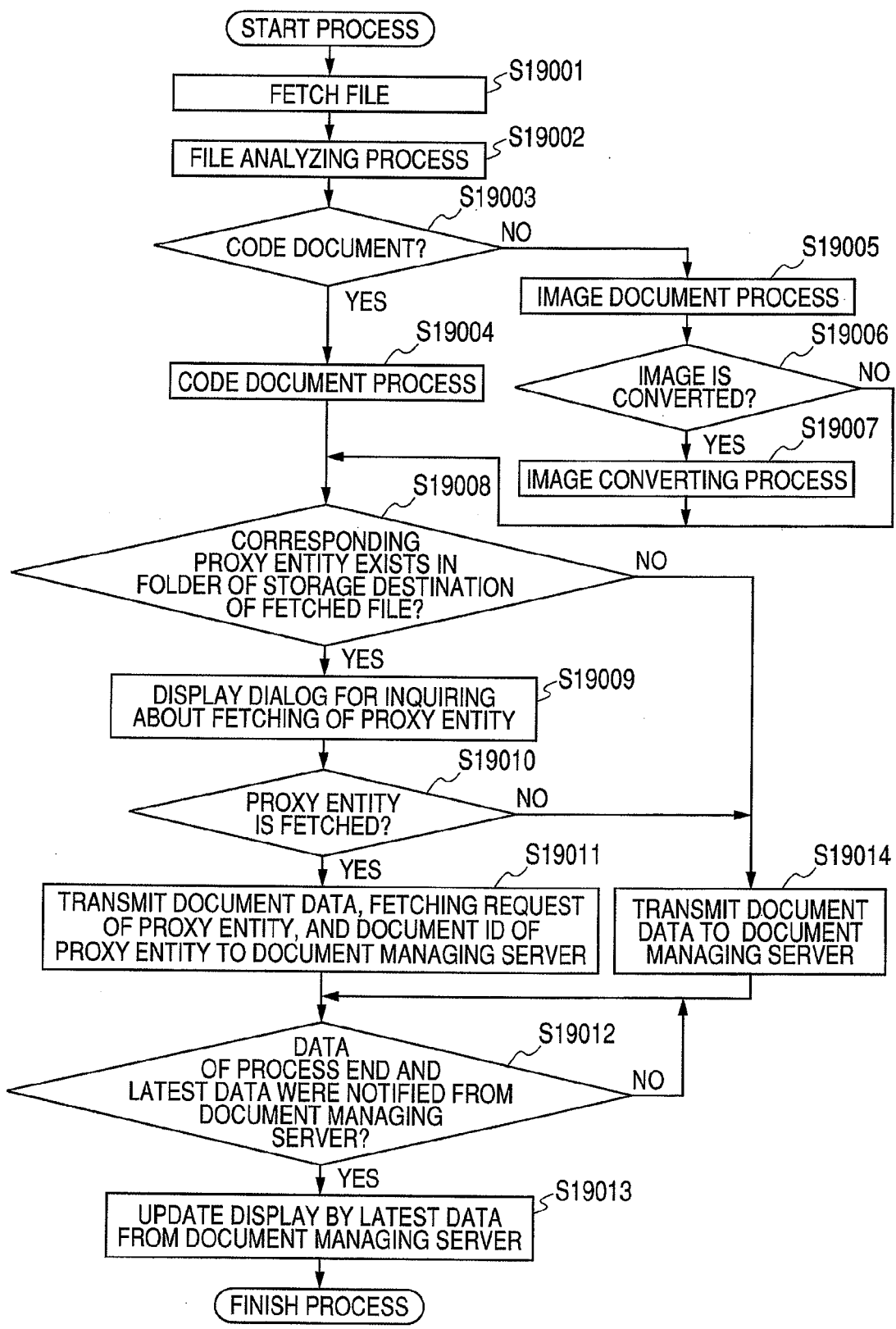
FIG. 18 illustrates the embodiment of the invention and is a flowchart for describing an example of processes of the document management client terminal at the time when the document has been registered into a folder in which the proxy entity exists.

First, an example of the processes of the document management client terminal 1000 side at the time when the document has been registered into the folder in which the proxy entity exists will be described. FIG. 18 is a flowchart for describing the example of the processes of the document management client terminal 1000 at the time when the document has been registered into a folder in which the proxy entity exists.

In step S19001 in FIG. 18, a process for fetching the file into an application is executed. This process is realized, for example, by a method whereby the device control unit 1003 fetches an image from the scanner into a document managing application. The process is also realized, for example, by a method whereby the file control unit 1004 fetches a file existing on the OS into the document managing application. Further, the process is also realized, for example, by a method whereby the external module communicating unit 1005 fetches a document from an external application into the document managing application.

Figure 19:
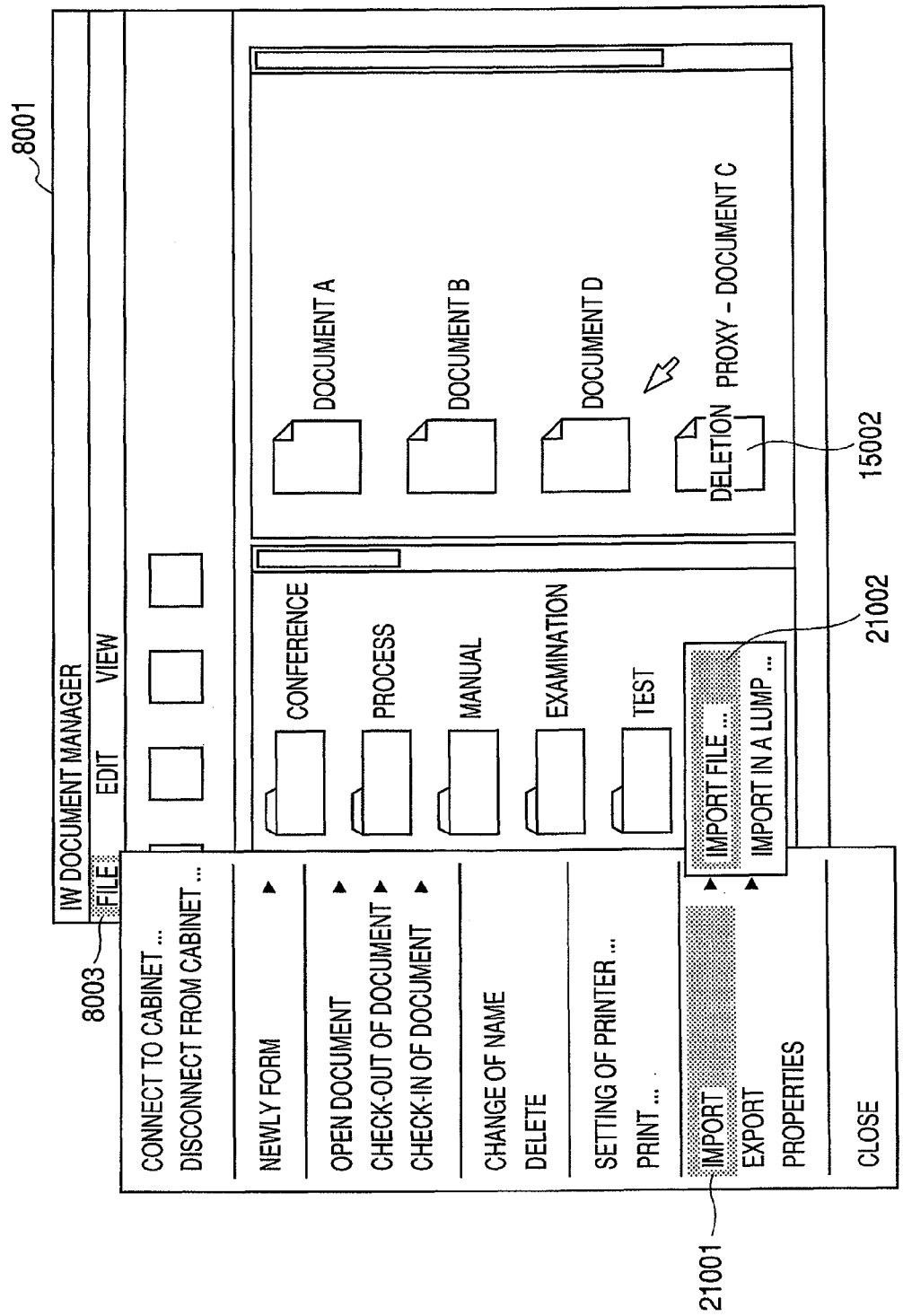
FIG. 19 illustrates the embodiment of the invention and is a diagram illustrating an example of "a menu display screen at the time of registering the document" which is displayed on the document management client terminal.

FIG. 19 is a diagram illustrating an example of "a menu display screen at the time of registering the document" which is displayed on the document management client terminal 1000.

As illustrated in FIG. 19, the user selects "Import file 21002" from an Import 21001 in the File menu 8003 of the application of the user interface 8001 of the user interface unit 1001. Thus, the Import of the file existing in the OS is instructed.

After the Import of the file was instructed by the user, the document management client terminal 1000 starts a document registering process.

First, in step S19002, the file analyzing unit 1008 executes a process for analyzing the file (document) fetched in step S19001. For example, the file analyzing unit 1008 executes a process for discriminating whether or not the document fetched in step S19001 can be handled by the document managing system or a process for fetching the attribute information or the like of the file itself.

Subsequently, in step S19003, the file analyzing unit 1008 discriminates whether or not the file (document) analyzed in step S19002 is an image document or a code document.

If the file (document) analyzed in step S19002 is the code document as a result of the discrimination, step S19004 follows and the code document processing unit 1009 executes a code document process. For example, the code document processing unit 1009 forms a thumbnail image to be displayed by the document management client terminal 1000 from the code document or extracts the attribute information held in the codes of the code document. The processing routine advances to step S19008, which will be described hereinafter.

If the file (document) analyzed in step S19002 is the image document, step S19005 follows and the image document processing unit 1010 executes an image document process. For example, the image document processing unit 1010 executes a process for forming a thumbnail image corresponding to the document data or the like. At this time, there is a case where the files are temporarily held in the internal data holding unit 1007.

Subsequently, in step S19006, the file analyzing unit 1008 discriminates whether or not the image document to be registered is image-converted and stored. If the image document is image-converted and stored as a result of the discrimination, step S19007 follows. The image document processing unit 1010 image-converts the image document and stores. The processing routine advances to step S19008, which will be described hereinafter.

Unless the image document is image-converted and stored, step S19007 is omitted and step S19008 follows.

When the processing routine advances to step S19008, the document management control unit 1006 discriminates whether or not the proxy entity corresponding to the name of the fetched file exists in the folder serving as a storage destination of the file fetched in step S19001. For example, the document management control unit 1006 discriminates whether or not the proxy entity of the name in which "Proxy ~" has been added to the head of the name obtained by excluding an extension from the file name of the fetched file exists in the folder of the storage destination.

If the proxy entity corresponding to the name of the fetched file exists in the folder serving as a storage destination of the file fetched in step S19001 as a result of the discrimination, step S19009 follows. When the processing routine advances to step S19009, the document management control unit 1006 displays a dialog for inquiring of the user about whether or not the proxy entity is fetched at the time of registering the document to the user interface unit 1001.

Figure 20:
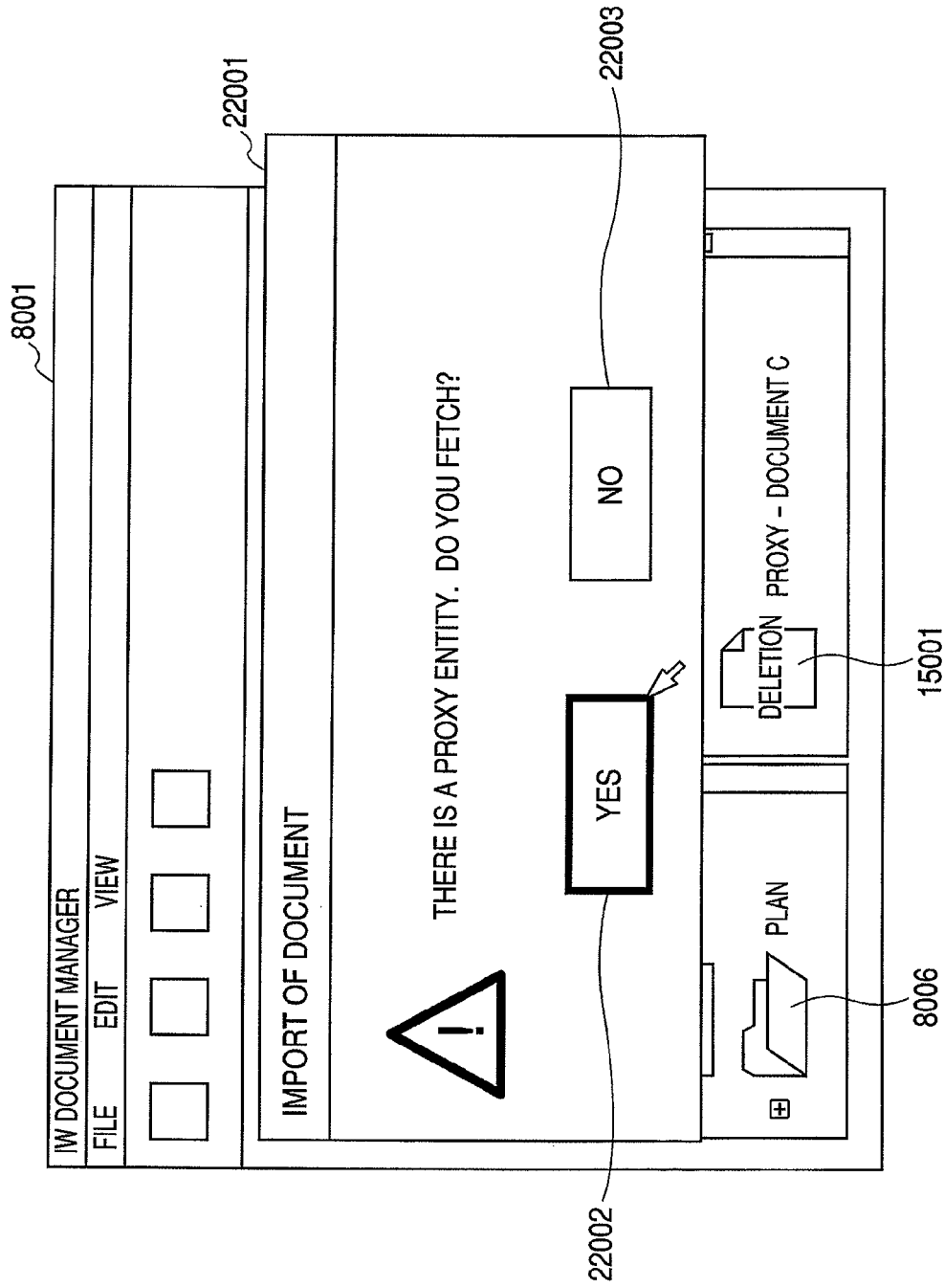
FIG. 20 illustrates the embodiment of the invention and is a diagram illustrating an example of a proxy entity fetching inquiry dialog at the time of registering the document.

FIG. 20 is a diagram illustrating an example of a proxy entity fetching inquiry dialog 22001 at the time of registering the document.

In FIG. 20, a button 22002 is used for the user to instruct that the proxy entity is fetched. A button 22003 is used for the user to instruct that the proxy entity is not fetched.

Returning to the description of FIG. 18, in step S19010, the document management control unit 1006 discriminates whether or not the proxy entity is fetched based on the operation of the user to the proxy entity fetching inquiry dialog 22001 at the time of registering the document.

If the proxy entity is fetched as a result of the discrimination, step S19011 follows. When the processing routine advances to step S19011, the communication control unit 1011 transmits the document data, a fetching request of the proxy entity, and the document ID of the proxy entity to the document managing server 1100.

Subsequently, in step S19012, the communication control unit 1011 waits until the data showing the process end and the latest data are received from the document managing server 1100.

When the data showing the process end and the latest data are received from the document managing server 1100, step S19013 follows. When the processing routine advances to step S19013, the document management control unit 1006 updates the display of the display screen based on the latest data received from the document managing server 1100.

Figure 21:
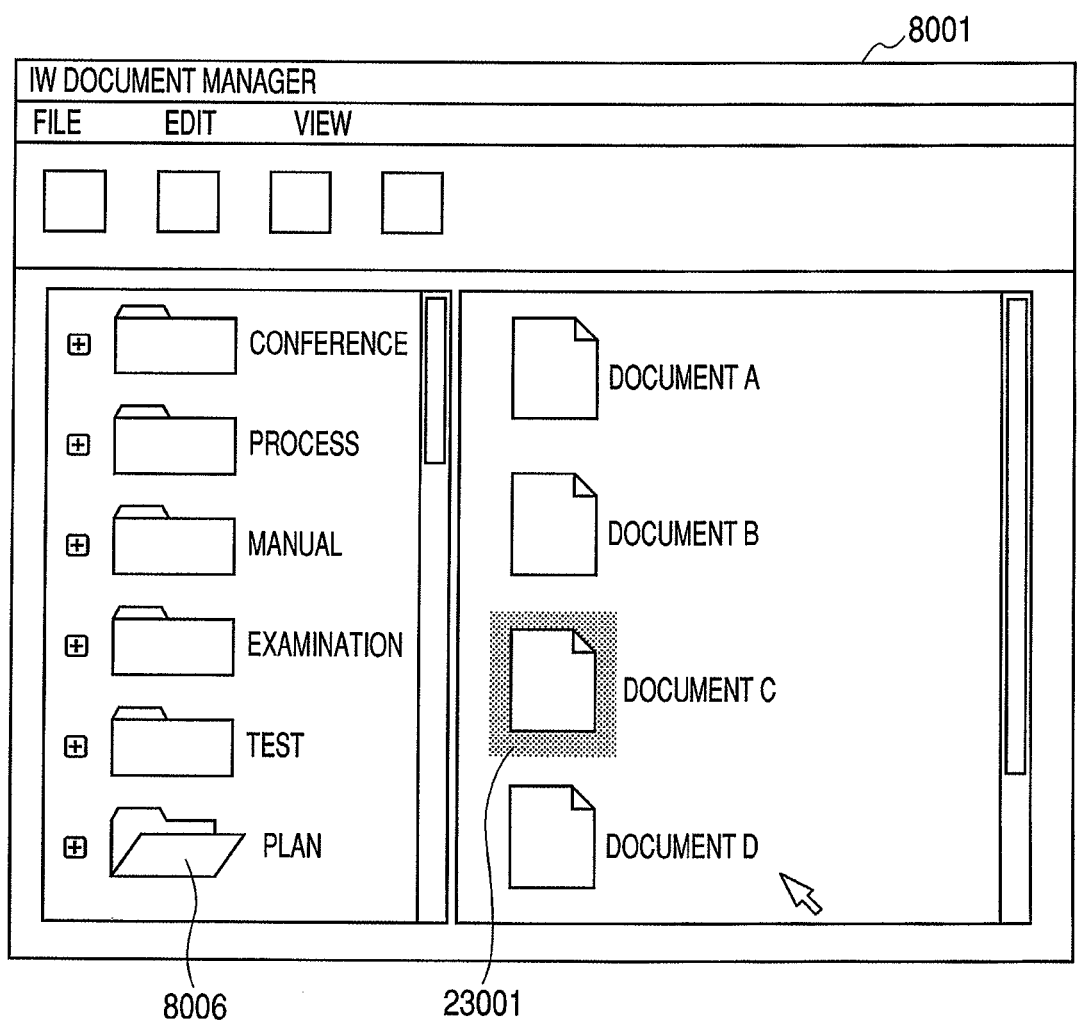
FIG. 21 illustrates the embodiment of the invention and is a diagram illustrating an example of "a document list display screen after the proxy entity was fetched and the document was registered" which is displayed on the document management client terminal.

FIG. 21 is a diagram illustrating an example of "a document list display screen after the proxy entity was fetched and the document was registered" which is displayed on the document management client terminal 1000.

In FIG. 21, a document 23001 is a document which was registered again into the folder 8006. The proxy entity (proxy entity 15001 illustrated in FIG. 13) which existed before the re-registration has been deleted.

If it is decided in step S19008 that the proxy entity corresponding to the name of the fetched file does not exist in the folder serving as a storage destination of the file fetched in step S19001, step S19014 follows. When the processing routine advances to step S19014, the communication control unit 1011 transmits the document data to the document managing server 1100. The processing routine advances to step S19012.

If it is decided in step S19010 that the proxy entity is not fetched, step S19014 also follows and the document data is transmitted to the document managing server 1100.

An example of the processes in the document management client terminal 1000 at the time when the document has been registered into the folder having the proxy entity has been described above.

<Processes in Document Managing Server at the time when Document is Registered into Folder Having Proxy Entity>

Figure 22:
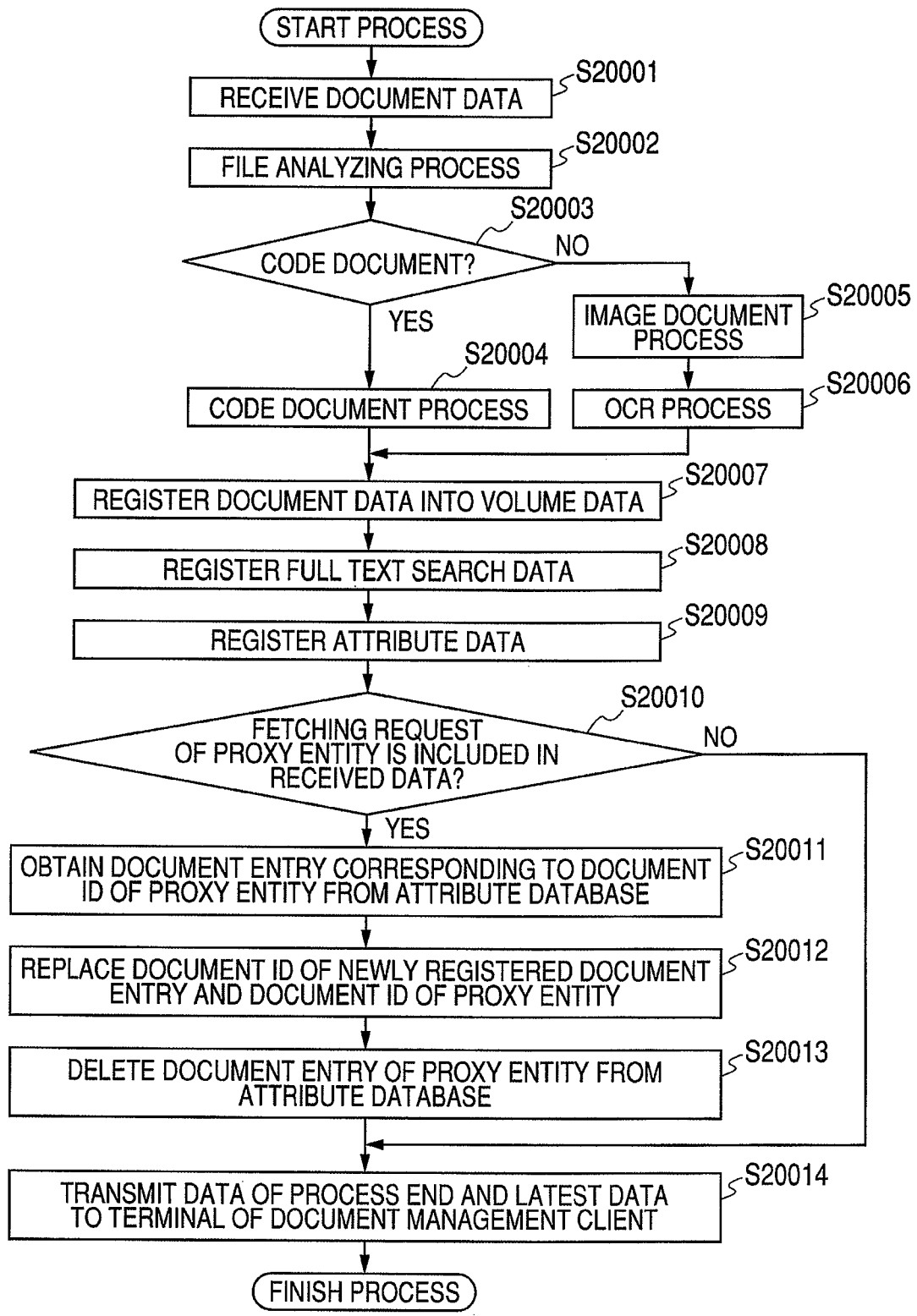
FIG. 22 illustrates the embodiment of the invention and is a flowchart for describing an example of processes of a document managing server at the time when the document is registered into a folder having the proxy entity.

Subsequently, the example of the processes in the document managing server 1100 side at the time when the document has been registered into the folder having the proxy entity will be described. FIG. 22 is a flowchart for describing the example of the processes of the document managing server 1100 at the time when the document is registered into the folder having the proxy entity.

In step S20001 in FIG. 22, the communication control unit 1101 receives the data including the document data transmitted from the document management client terminal 1000. In order to allow the document management client terminal 1000 to communicate with the document managing server 1100, it is necessary that the user has already been authenticated in the document managing server 1100. After the user was authenticated, all commands transmitted from the document management client terminal 1000 of the authenticated user become the commands which were made under authority of the authenticated user.

Subsequently, in step S20002, the file analyzing unit 1103 executes a process for analyzing the document data received in step S20001 based on an instruction from the search control unit 1102.

Subsequently, in step S20003, the file analyzing unit 1103 discriminates whether the document data analyzed in step S20002 is the image document or the code document. In order to search for the document registered in the document managing server 1100, it is necessary to extract index data for document search from the document. For this purpose, it is necessary to analyze the contents of the document data and a module for processing the document data is changed based on a result of the analysis.

If the document data analyzed in step S20002 is the code document as a result of the discrimination, step follows and the code document processing unit 1104 executes a code document process. For example, the code document processing unit 1104 extracts the index data for document search from the code document. The processing routine advances to step S20007, which will be described hereinafter.

If the document data analyzed in step S20002 is the image document, step S20005 follows. The image document processing unit 1105 executes an image document process. For example, the image document processing unit 1105 executes an image conversion of the document data. The image conversion which is executed here is a process for obtaining an image suitable for OCR. Data which is actually registered into the database is the document data received from the document management client terminal 1000.

Subsequently, in step S20006, the OCR engine 1106 executes an OCR process to the document data which was image-converted in step S20005 and extracts the index data for document search, and step S20007 follows.

When the processing routine advances to step S20007, the database control unit 1110 executes a process for storing the document data received from the document management client terminal 1000 in step S20001 into the volume database 1111. The data which is stored into the volume database 1111 is the received document data itself and the data of the thumbnail image. If the image annotation has been pasted to the document data, the image for annotation is also stored into the volume database 1111.

Subsequently, in step S20008, the database control unit 1110 executes a process for registering the index data for document search extracted from the document data into the database 1113 for full text search.

Subsequently, in step S20009, the database control unit 1110 registers attribute data of the document and the document ID and the like of the document data registered in the volume database 1111 into a table provided in the attribute database 1112.

Subsequently, in step S20010, the document management control unit 1107 discriminates whether or not a fetching request of the proxy entity is included in the data received from the document management client terminal 1000 in step S20001.

If the fetching request of the proxy entity is included in the data received from the document management client terminal 1000 as a result of the discrimination, step S20011 follows. When the processing routine advances to step S20011, the database control unit 1110 obtains the document entry corresponding to the document ID of the proxy entity received from the document management client terminal 1000 in step S20001 from the attribute database 1112.

Subsequently, in step S20012, the document management control unit 1107 exchanges the document ID of the document entry which was newly registered in step S20009 and the document ID of the proxy entity received from the document management client terminal 1000 in step S20001.

As mentioned above, according to the embodiment, for example, by executing the process of step S20012, an example of a changing unit is realized.

Subsequently, in step S20013, the database control unit 1110 deletes the document entry of the proxy entity from the table provided in the attribute database 1112.

As mentioned above, according to the embodiment, for example, by executing the process of step S20013, an example of a deleting unit is realized.

Subsequently, in step S20014, the communication control unit 1101 transmits the data showing the process end and the latest data (for example, data obtained after it was changed in the flowchart of FIG. 22) to the document management client terminal 1000.

If it is determined in step S20010 that the fetching request of the proxy entity is not included in the data received from the document management client terminal 1000 in step S20001, step S20014 mentioned above follows. The data showing the process end and the latest data are transmitted to the document management client terminal 1000.

An example of the processes in the document managing server 1100 at the time when the document had been registered in the folder having the proxy entity has been described above.

In step S19011 in FIG. 18, in addition to the document ID of the proxy entity, the owner ID (user ID) of the proxy entity may be transmitted from the document management client terminal 1000 to the document managing server 1100. In such a case, for example, the following processes can be executed.

First, the following processes are executed after steps S20004 and S20006 in FIG. 22.

That is, whether or not the document ID in the document data received in step S20001 (file name of the document) corresponds to the document ID (file name) in the proxy entity existing in the same folder as that of the document data is discriminated. Further, whether or not the owner ID included in the data received in step S20001 (owner ID of the user who will newly register the document) and the owner ID of the proxy entity (owner ID of the user who has deleted the document into the trash box) coincide is also discriminated.

If at least any one of them does not coincide, the processes in steps S20007 to S20009 and S20014 are executed. If both of them coincide, the processes in steps S20007 to S20009 and S20011 to S20014 are executed.

<Processes in Document Management Client at the Time when Document Having Proxy Entity has Been Moved from Trash Box>

Figure 23:
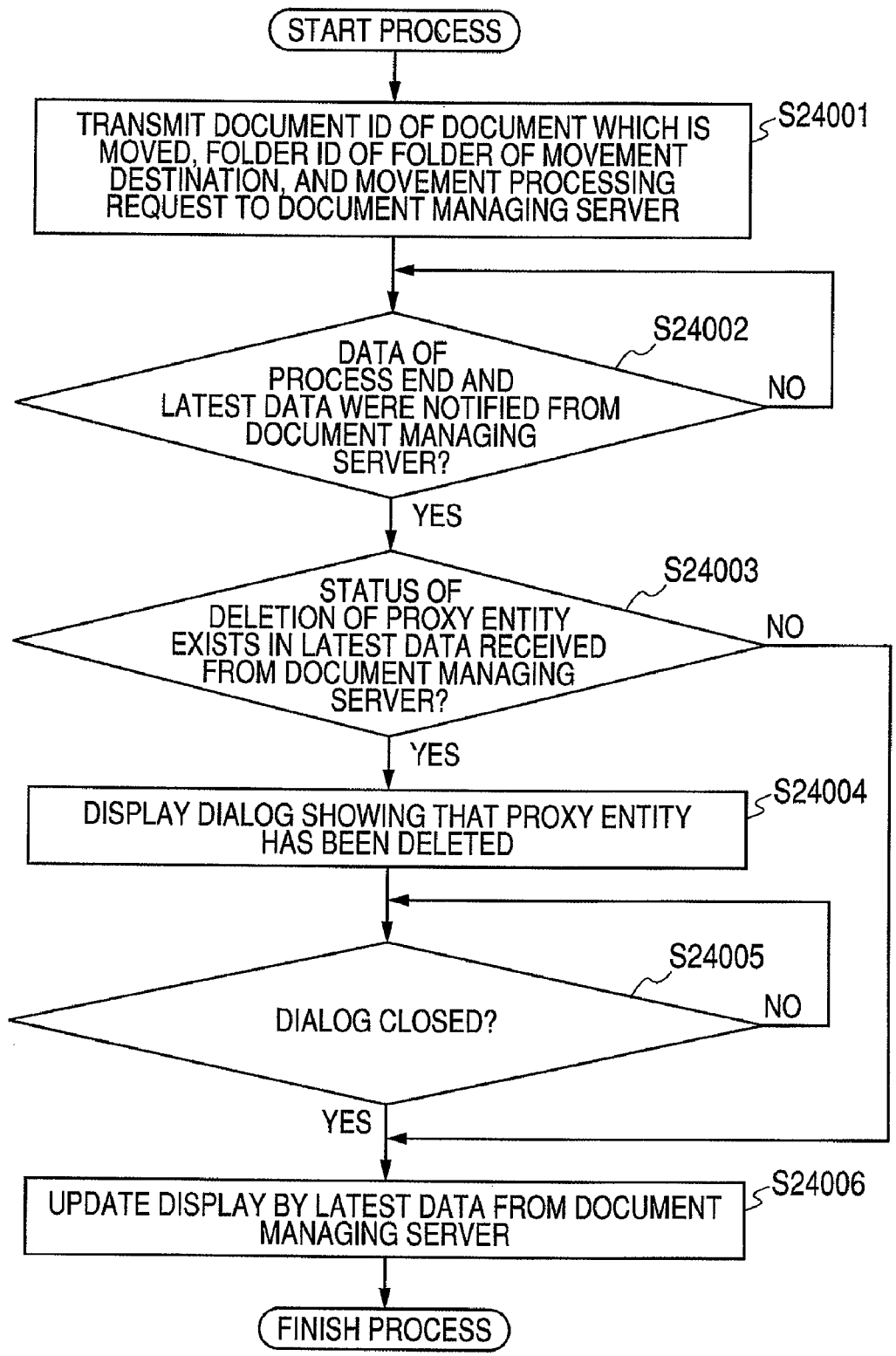
FIG. 23 illustrates the embodiment of the invention and is a flowchart for describing an example of processes of the document management client terminal at the time when the document having the proxy entity has been moved from the trash box.

First, an example of processes on the document management client terminal 1000 side at the time when the document having proxy entity has been moved from the trash box will be described. FIG. 23 is a flowchart for describing the example of the processes of the document management client terminal 1000 at the time when the document having the proxy entity has been moved from the trash box.

The selected document 16002 is moved from the trash box 16001 to another folder by such a user's operation that "copy and paste" of an Edit menu of the user interface 8001 is selected or the like (refer to FIG. 14). Thus, the document management client terminal 1000 starts a process for moving the document from the trash box.

In step S24001 in FIG. 23, the communication control unit 1011 notifies the document managing server 1100 of execution of the moving process together with the document ID of the selected document 16002 in the trash box 16001 and the folder ID of the folder designated as a movement destination.

Subsequently, in step S24002, the communication control unit 1011 waits until the data showing the process end and the latest data are received from the document managing server 1100.

When the data showing the process end and the latest data are received from the document managing server 1100, step S24003 follows. When the processing routine advances to step S24003, the document management control unit 1107 discriminates whether or not a status of proxy entity deletion is included in the latest data received from the document managing server 1100.

If the status of the proxy entity deletion is not included in the latest data received from the document managing server 1100 as a result of the discrimination, steps S24004 and S24005 are omitted and the processing routine advances to step S24006, which will be described hereinafter.

If the status of the proxy entity deletion is included in the latest data received from the document managing server 1100, step S24004 follows. When the processing routine advances to step S24004, the document management control unit 1006 displays a dialog showing a fact that the proxy entity has been deleted to the user interface unit 1001.

Figure 24:
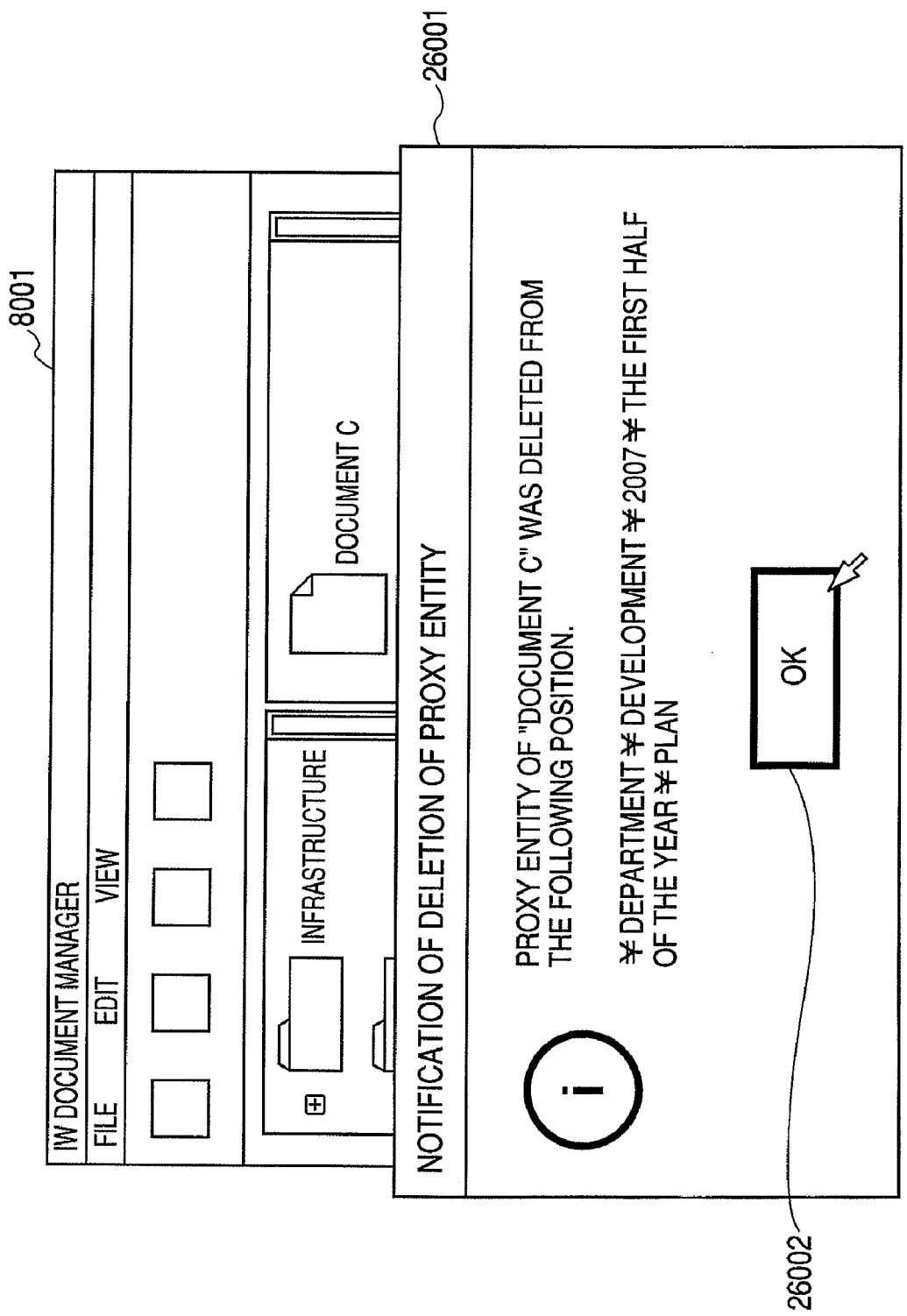
FIG. 24 illustrates the embodiment of the invention and is a diagram illustrating an example of "a proxy entity deletion notifying dialog at the time when the document having the proxy entity has been moved from the trash box" which is displayed on the document management client terminal.

FIG. 24 is a diagram illustrating an example of "a proxy entity deletion notifying dialog at the time when the document having the proxy entity has been moved from the trash box" which is displayed on the document management client terminal 1000.

In FIG. 24, a button 26002 is used for the user to instruct that a proxy entity deletion notifying dialog 26001 is closed.

In step S24005, the document management control unit 1006 waits until the proxy entity deletion notifying dialog 26001 is closed. When the proxy entity deletion notifying dialog 26001 is closed, step S24006 follows. When the processing routine advances to step S24006, the document management control unit 1006 updates the display of the display screen based on the latest data received from the document managing server 1100.

An example of the processes at the time when the document having the proxy entity had been moved from the trash box has been described above.

<Processes in Document Managing Server at the Time when Document Having Proxy Entity has Been Moved from Trash Box>

Figure 25:
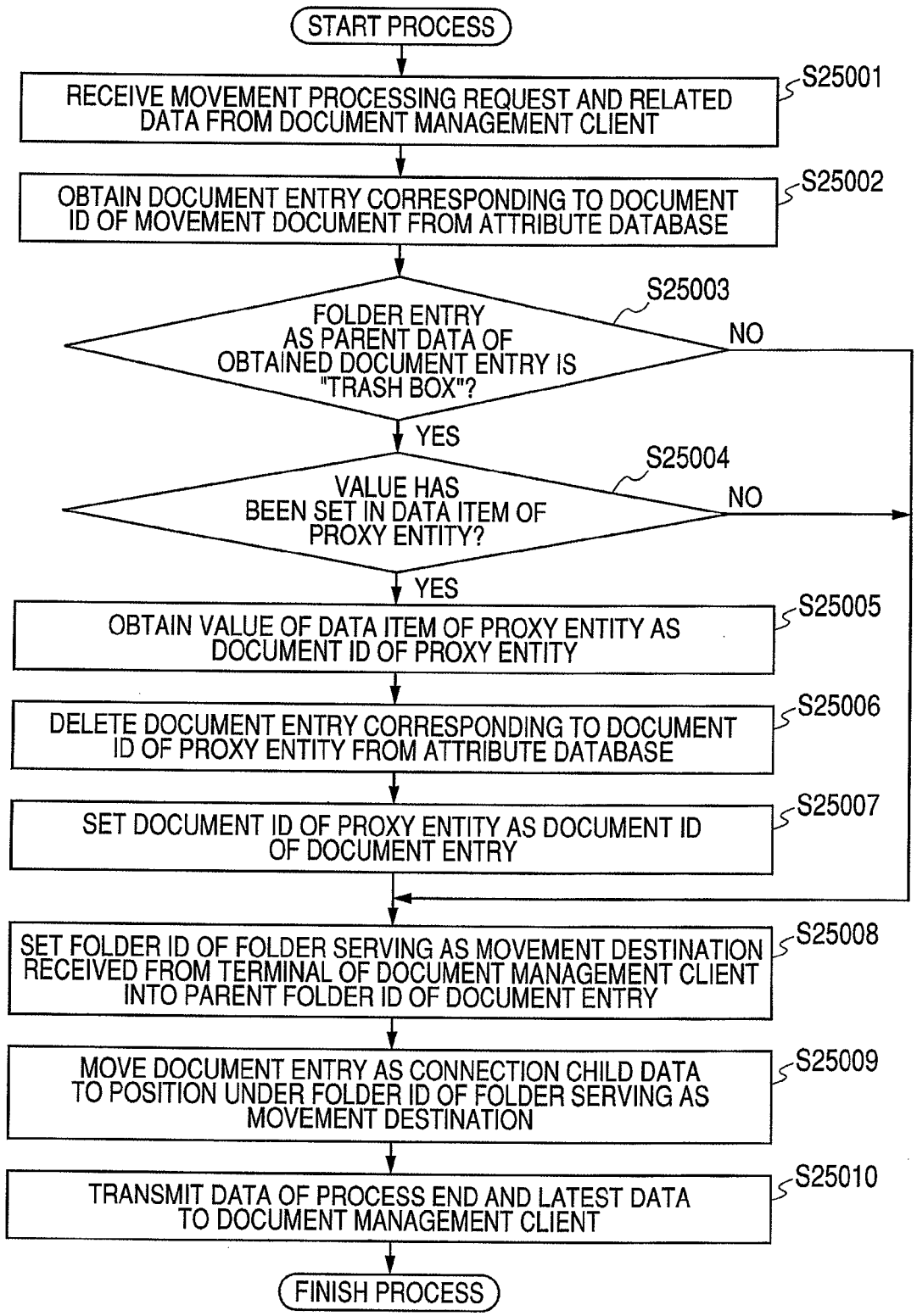
FIG. 25 illustrates the embodiment of the invention and is a flowchart for describing an example of processes of the document managing server at the time when the document having the proxy entity has been moved from the trash box.

Subsequently, an example of processes in the document managing server 1100 side at the time when the document having the proxy entity has been moved from the trash box will be described. FIG. 25 is a flowchart for describing the example of the processes of the document managing server 1100 at the time when the document having the proxy entity has been moved from the trash box.

In step S25001 in FIG. 25, the communication control unit 1101 receives the data (an instruction to execute the moving process, a document ID of the movement document in the trash box, and a folder ID of a folder designated as a movement destination) transmitted from the document management client terminal 1000. In order to allow the document management client terminal 1000 to communicate with the document managing server 1100, it is necessary that the user has already been authenticated in the document managing server 1100. After the user was authenticated, all commands transmitted from the document management client terminal 1000 of the authenticated user become the commands which were made under authority of the authenticated user.

Subsequently, in step S25002, the database control unit 1110 obtains the document entry corresponding to the document ID received from the document management client terminal 1000 in step S25001 from the attribute database 1112.

Subsequently, in step S25003, the document management control unit 1107 discriminates whether or not the folder entry as parent data of the document entry obtained in step S25002 is the "trash box".

If the folder entry as parent data of the document entry obtained in step S25002 is not the "trash box" as a result of the discrimination, steps S25004 to S25007 are omitted and the processing routine advances to step S25008, which will be described hereinafter.

If the folder entry as parent data of the document entry obtained in step S25002 is the "trash box", step S25004 follows. When the processing routine advances to step S25004, the document management control unit 1107 discriminates whether or not a value has been set in the item of the data of the proxy entity of the document attribute information of the document entry obtained in step S25002. If the value is not set in the item of the data of the proxy entity of the document attribute information of the document entry obtained in step S25002 as a result of the discrimination, steps S25005 to S25007 are omitted and the processing routine advances to step S25008, which will be described hereinafter.

If the value has been set in the item of the data of the proxy entity of the document attribute information of the document entry obtained in step S25002, step S25005 follows. When the processing routine advances to step S25005, the document management control unit 1107 obtains the value in the item of the data of the proxy entity of the document attribute information of the document entry obtained in step S25002 as a document ID of the proxy entity.

Subsequently, in step S25006, the database control unit 1110 deletes the document entry corresponding to the document ID of the proxy entity obtained in step S25005 from the attribute database 1112.

As mentioned above, in the embodiment, for example, an example of a second deleting unit is realized by executing the process of step S25006.

Subsequently, in step S25007, the database control unit 1110 sets the document ID of the proxy entity obtained in step S25005 as a document ID of the document entry.

As mentioned above, in the embodiment, for example, an example of a second changing unit is realized by executing the process of step S25007.

Subsequently, in step S25008, the database control unit 1110 sets the "folder ID of the folder designated as a movement destination" received from the document management client terminal 1000 into the parent folder ID of the document entry.

Subsequently, in step S25009, the database control unit 1110 moves the document entry as child data which is connected to a position under the folder ID.

Subsequently, in step S25010, the communication control unit 1101 transmits the data indicative of the end of processes and the latest data (for example, data obtained after it was changed in the flowchart of FIG. 25) including the status of the proxy entity deletion to the document management client terminal 1000.

An example of the processes in the document managing server 1100 at the time when the document having the proxy entity had been moved from the trash box has been described above.

<Processes in Document Management Client Terminal at the Time when Proxy Entity has Been Opened from Document Shortcut>

Figure 26:
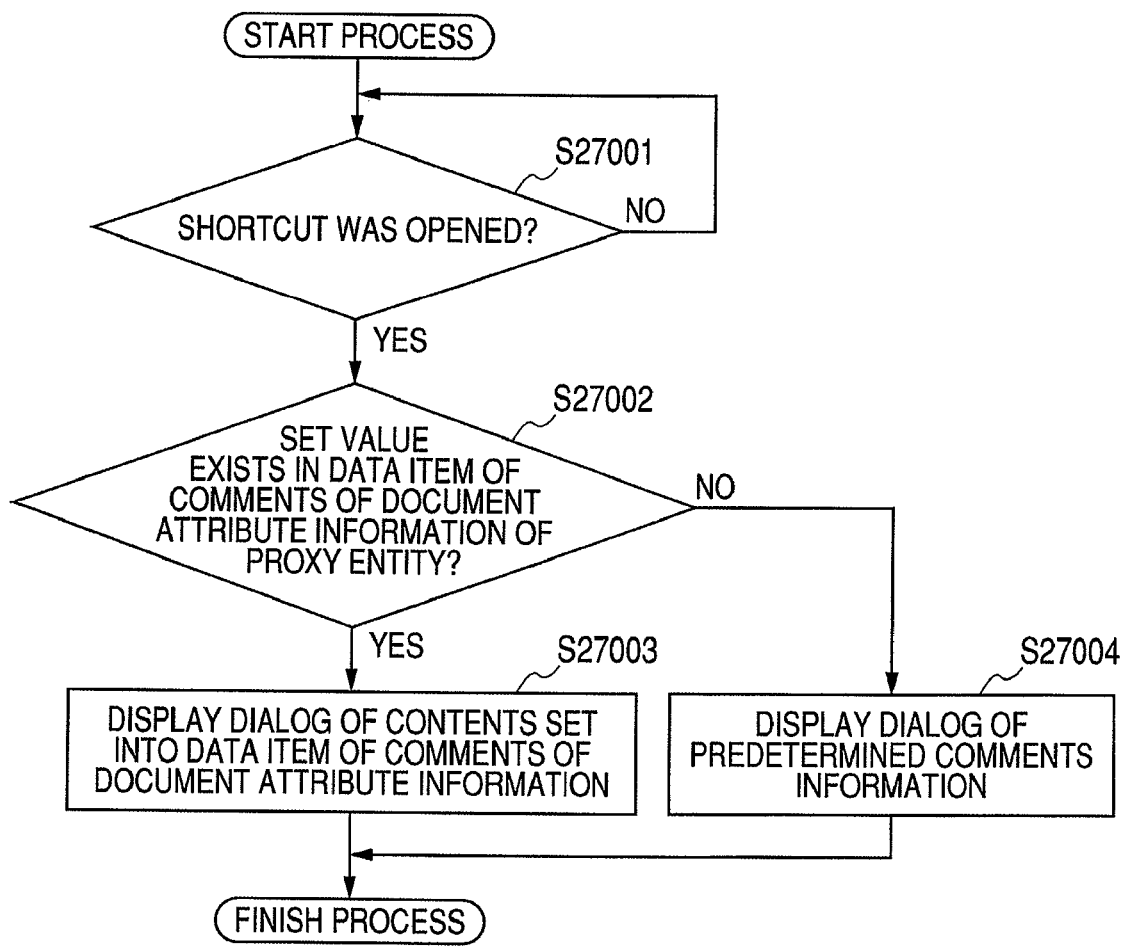
FIG. 26 illustrates the embodiment of the invention and is a flowchart for describing an example of processes of the document management client terminal at the time when the proxy entity has been opened from the document shortcut.

FIG. 26 is a flowchart for describing an example of processes of the document management client terminal 1000 at the time when the proxy entity has been opened from the document shortcut.

In step S27001 in FIG. 26, the document management control unit 1006 waits until the shortcut formed in the file system of the OS is opened. When the shortcut is opened, step S27002 follows. When the processing routine advances to step S27002, the document management control unit 1107 discriminates whether or not a value has been set into a data item of the comments 5107 of the document attribute information of the proxy entity stored in the internal data holding unit 1007.

If the value has been set in the data item of the comments 5107 of the document attribute information of the proxy entity as a result of the discrimination, step S27003 follows. When the processing routine advances to step S27003, the document management control unit 1006 displays a dialog for displaying comment information based on the value in the data item onto the user interface unit 1001.

As mentioned above, in the embodiment, for example, an example of a display unit is realized by executing the process of step S27003.

Figure 27:
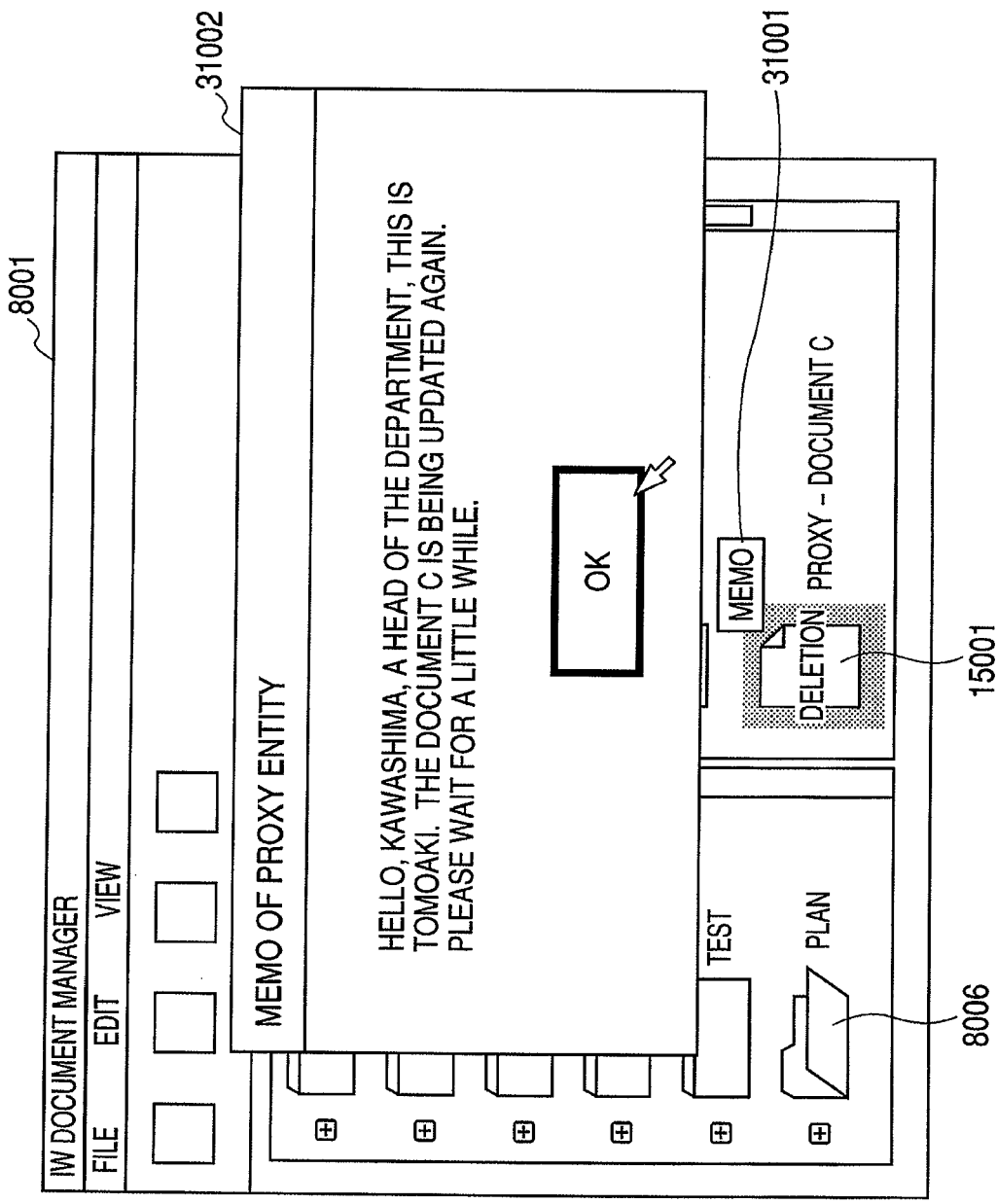
FIG. 27 illustrates the embodiment of the invention and is a diagram illustrating an example of a comment message displaying dialog at the time when the proxy entity has been opened from the document shortcut.

FIG. 27 is a diagram illustrating an example of a comment message displaying dialog 31002 at the time when the proxy entity has been opened from the document shortcut. In FIG. 27, information (icon) 31001 showing that there is comment information in the proxy entity 15001 is displayed.

A comment message (contents of the comment message displaying dialog 31002) at the time when the proxy entity has been opened is preset by the user here.

Figure 28:
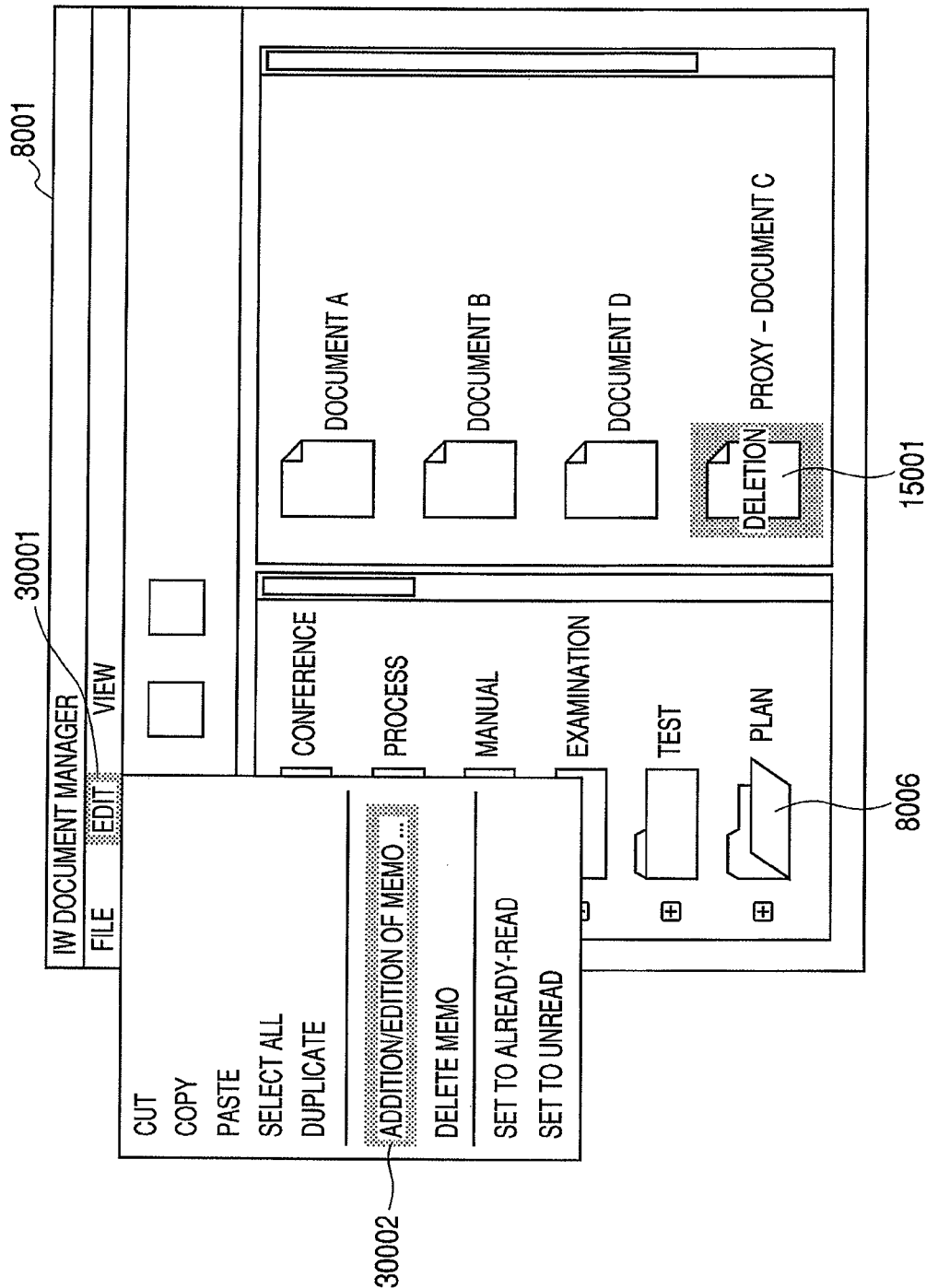
FIG. 28 illustrates the embodiment of the invention and is a diagram illustrating an example of a document memo setting menu display screen which is displayed on the document management client terminal.

FIG. 28 is a diagram illustrating an example of a document memo setting menu display screen which is displayed on the document management client terminal 1000.

As illustrated in FIG. 28, after the user selected a proxy entity 15002, he selects "Addition/edition of memo" 30002 from an Edit menu 30001 of the application and executes the addition/edition of the memo. Thus, the comment message can be set into the document attribute information of the proxy entity.

As mentioned above, in the embodiment, for example, an example of a setting unit is realized by setting the comment message into the document attribute information of the proxy entity in this manner.

Returning to the description of FIG. 26, in step S27002, if it is decided that the value is not set in the data item of the comments 5107 of the document attribute information of the proxy entity, step S27004 follows. When the processing routine advances to step S27004, the document management control unit 1006 displays a dialog for displaying the specified comment information to the user interface unit 1001.

Figure 29:
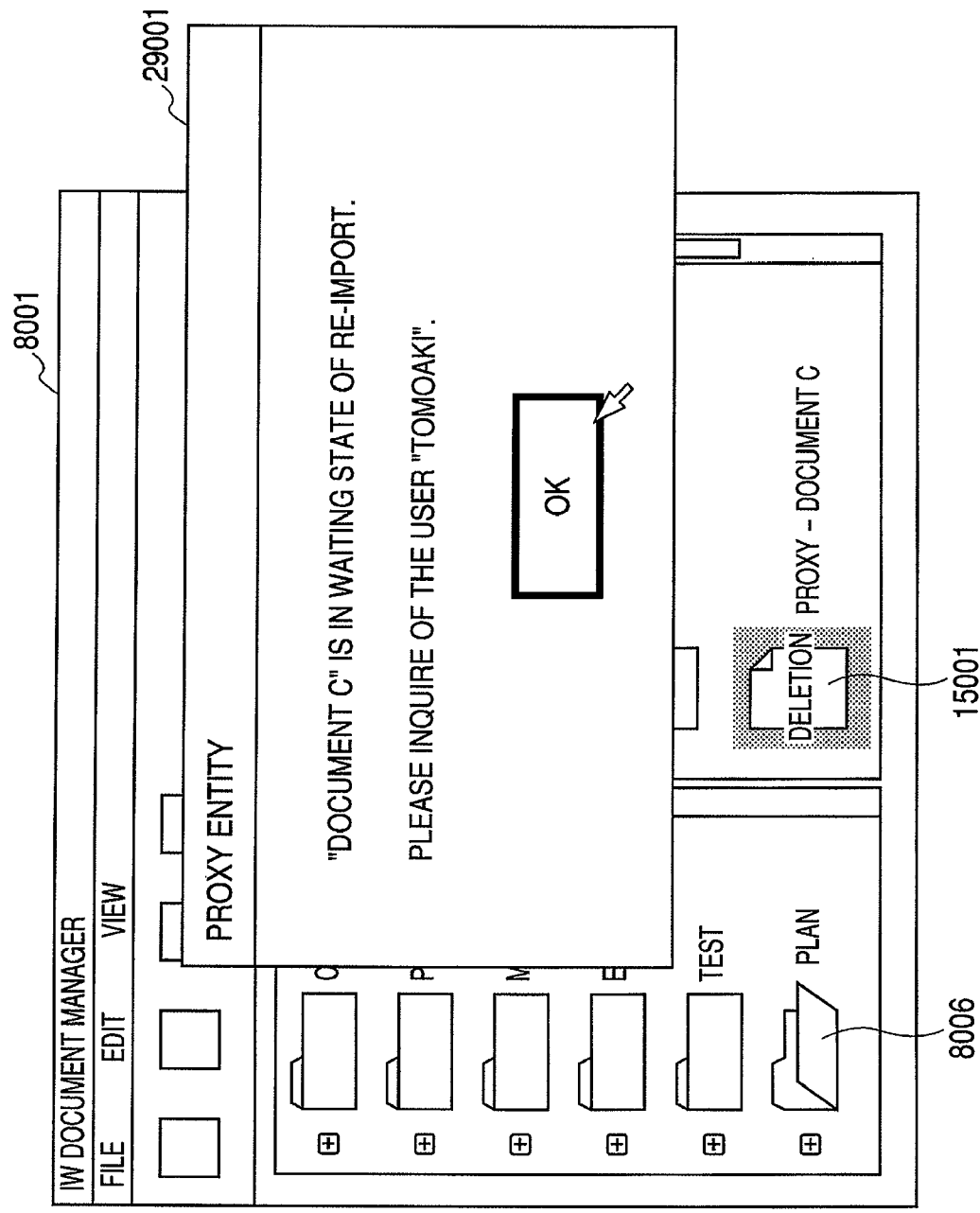
FIG. 29 illustrates the embodiment of the invention and is a diagram illustrating an example of a specified message displaying dialog at the time when the proxy entity has been opened from the document shortcut.

FIG. 29 is a diagram illustrating an example of a specified message displaying dialog 29001 at the time when the proxy entity has been opened from the document shortcut.

As mentioned above, in the embodiment, for example, an example of the display unit is realized by executing the process of step S27004.

The information (message) which is displayed in step S27003 or S27004 is not limited to the foregoing information so long as it is information regarding that a link destination of the document shortcut is not the document but is the proxy entity of the document.

An example of the processes in the document management client 1000 at the time when the proxy entity had been opened from the document shortcut has been described above.

As mentioned above, in the embodiment, when the formation of the shortcut of the document is instructed, the shortcut including the document ID of the document is formed and the attributes (shortcut formation history) of the document are updated. After that, when the deletion of the document into the trash box and the formation of the proxy entity of the document are instructed, a proxy entity in which the same user ID as the user ID set in the document to be deleted has been set is formed. This proxy entity is formed in the same folder as the folder in which the document to be deleted exists. The document ID of the document to be deleted and the document ID of the formed proxy entity are exchanged and the document to be deleted is moved (deleted) into the trash box.

When the document is newly registered into the folder in which only the proxy entity has been stored as mentioned above and the fetching of the proxy entity is instructed, the following processes are executed. That is, the document ID of the newly registered document and the document ID of the proxy entity are exchanged or the like and document management information of the proxy entity is set into the newly registered document, and thereafter, the proxy entity is deleted.

When the movement of the document which has been moved (deleted) into the trash box to another location is instructed, the document ID of the proxy entity of the document is obtained and the proxy entity is deleted. The document ID of the document to be moved is set into the document ID of the obtained proxy entity and the document is moved to the instructed location from the trash box.

As mentioned above, when the proxy entity exists, the document ID as an access destination of the shortcut becomes the document ID of the deleted document. Therefore, when the shortcut is opened in a state where the proxy entity exists, the proxy entity is accessed and the comments set into the proxy entity are dialog-displayed.

Therefore, when exchanging the document, the shortcut to the document before the exchange is enabled to effectively act also on the document after the exchange. That is, even if the document on the link destination side of the shortcut is exchanged, the document management information of the original document can be reflected to the exchanged document. Therefore, the requester doesn't need to issue again the E-mail to which the shortcut to the exchanged document has been attached to the approver like "work flow for approval request of the document" disclosed in the related art. In other words, after the document was temporarily deleted, the document can be easily exchanged without being aware of the formed shortcut.

The document management information including the document ID of the document which the shortcut holds as an access destination is succeeded to the new document. Therefore, such a construction that while succeeding the document management information, the document type is changed to a new type and the document is exchanged can be easily realized.

Further, by the shortcut of the document, when the proxy entity is opened, a message indicative of the proxy of the original document or a message which has uniquely been set can be displayed. Therefore, even in the case where the approver has opened the proxy entity from the shortcut attached to the E-mail, the approver can read the message set by the requester, grasp a situation, and extend the approving operation.

As mentioned above, in the embodiment, when the document in which the shortcut has been set is exchanged to another document, the shortcut to the document before the exchange is enabled to effectively act on the document after the exchange.

(Another Embodiment of the Invention)

Each of the units constructing the document managing system in the embodiment of the invention mentioned above and each step of the document managing method can be realized by a method whereby a program stored in a RAM, a ROM, or the like of a computer is made operative. The program and a computer-readable recording medium in which the program has been recorded are incorporated in the invention.

The invention can be embodied by, for example, a system, an apparatus, a method, a program, a storing medium, or the like. Specifically speaking, the invention can be applied to a system constructed by a plurality of apparatuses or an apparatus constructed by one device.

The invention also incorporates a case where a program of software for realizing the functions of the embodiments mentioned above (in the embodiments, the program corresponding to the flowcharts illustrated in FIG. 5 and the like) is supplied to the system or apparatus directly or from a remote place. The invention also incorporates a case where the functions of the embodiments mentioned above are accomplished by a method whereby a computer of the system or apparatus reads out the supplied program codes and executes them.

Therefore, the program codes themselves which are installed into the computer in order to realize the functions and processes of the invention also realize the invention. That is, the invention also incorporates the computer program itself for realizing the functions and processes of the invention.

In such a case, the invention is not limited to the program form as mentioned above but may have an arbitrary form such as object codes, program that is executed by an interpreter, script data which is supplied to the OS, or the like so long as it has the functions of the program.

As a recording medium for supplying the program, for example, a floppy (registered trademark) disk, a hard disk, an optical disk, a magnetooptic disk, an MO, a CD-ROM, a CD-R, a CD-RW, or the like can be mentioned. A magnetic tape, a non-volatile memory card, a ROM, a DVD (DVD-ROM, DVD-R), or the like can be also mentioned.

As another program supplying method, the program can be also supplied by a method whereby a client computer is connected to Homepage of the Internet by using a browser of the client computer and the computer program itself of the invention or a file which has been compressed and has an automatic installing function is downloaded from Homepage to a recording medium such as a hard disk or the like.

The program supplying method can be also realized by a method whereby the program codes constructing the program of the invention are divided into a plurality of files and each file is downloaded from different Homepage. That is, a WWW sever for allowing a plurality of users to download a program file for realizing the functions and processes of the invention by the computer is also incorporated in the invention.

The program supplying method can be also realized by a method whereby the program of the invention is encrypted and stored into a storing medium such as a CD-ROM or the like and distributed to the users, the user who can clear predetermined conditions are allowed to download key information adapted to decrypt the encryption from Homepage through the Internet, the encrypted program is executed by using the downloaded key information, and the program is installed into the computer.

The functions of the embodiments mentioned above are also realized by a method whereby the computer executes the read-out program. As another method, an OS or the like which is operating on the computer executes a part or all of the actual processes based on instructions of the program, and the functions of the embodiments mentioned above are also realized by those processes.

Further, the functions of the embodiments mentioned above are also realized by a method whereby the program read out of a recording medium is written into a memory equipped for a function expanding board inserted in a computer or a function expanding unit connected to the computer, after that, a CPU or the like provided for the function expanding board or the function expanding unit executes a part or all of the actual processes based on instructions of the program, and the functions of the embodiments mentioned above are also realized by those processes.

Each of the foregoing embodiments is nothing but the specific examples for embodying the invention. A technical scope of the invention must not be limitatively interpreted by them. That is, the invention can be embodied in various forms without departing from its technical idea of the invention or the spirit and features of the invention.

Although several exemplary embodiments of the invention have bee mentioned as examples and described above, the invention is not limited to those embodiments but, naturally, many modifications and applications are possible within the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-149816, filed Jun. 6, 2008 which is hereby incorporated by reference herein in its entirety.

What is claimed is:

1. A document managing system comprising one or more processors functioning as:

a shortcut forming unit configured to form a shortcut of a document when a formation of the shortcut is instructed by a user, the shortcut including information of a first document ID of the document;

a registering unit configured to register history information that indicates whether the shortcut of the document has been formed by the shortcut forming unit;

a determining unit configured to determine, when a deletion of the document is instructed by a user, whether the history information indicates that the shortcut of the document has been formed;

a proxy data forming unit configured to, when the deletion of the document is instructed by the user and the determining unit determines that the history information indicates that the shortcut of the document has been formed, form and store proxy data into a same folder in which the document has been stored, wherein the first document ID of the document is set as a document ID of the proxy data, and wherein the proxy data forming unit does not form and store the proxy data when the determining unit determines that the history information indicates that the shortcut of the document has not been formed;

a moving unit configured to, when the deletion of the document is instructed by the user, change the first document ID of the document to another, second document ID and move the changed document into a predetermined storing area that holds deleted data;

a changing unit configured to, when a new document is registered into the folder where the proxy data is stored, set the first document ID, which has been set to the proxy data, as a document ID of the new document; and a deleting unit configured to, when the new document is registered into the folder where the proxy data is stored, delete the proxy data.

2. The document managing system according to claim 1, the one or more processors further functioning as:

a second deleting unit configured to, when the document is further moved from the predetermined storing area to another area, delete the proxy data; and a second changing unit configured to, when the document is further moved from the predetermined storing area to another area, change the second document ID of the further moved document to the first document ID which has been set to the proxy data.

3. The document managing system according to claim 1, the one or more processors further functioning as:

a display unit configured to, when the shortcut is opened, if there is the proxy data to which the first document ID being included in the shortcut has been set, display information showing that a link destination of the shortcut is the proxy data to a display apparatus.

4. The document managing system according to claim 1, the one or more processors further functioning as:

a setting unit configured to set a message to the proxy data; and a display unit configured to, when the shortcut is opened, if there is the proxy data to which the first document ID being included in the shortcut has been set, display a message set to the proxy data to a display apparatus.

5. The document managing system according to claim 1, the one or more processors further functioning as:

an inquiry unit configured to, when the deletion of the document whose shortcut has been formed is instructed by the user, inquire of the user about whether or not the proxy data is to be formed, and wherein when the user instructs that the proxy data is to be formed in response to the inquiry, the proxy data forming unit forms and stores the proxy data into the same folder in which the document has been stored, wherein the first document ID of the document is set as a document ID of the proxy data.

6. The document managing system according to claim 1, wherein the proxy data forming unit forms and stores the proxy data to which a user ID of the user who instructed the deletion of the document has been further set, and wherein, when the new document is registered into the folder where the proxy data is stored, and when the user who instructed the registration of the new document corresponds to the user ID which has been further set to the proxy data, the changing unit sets the first document ID, which has been set to the proxy data, as the document ID of the new document.

7. A document managing method which is executed by one or more processors, the method comprising:

a shortcut forming step that forms a shortcut of a document when a formation of the shortcut is instructed by a user, the shortcut including information of a first document ID of the document;

a registering step that registers history information that indicates whether the shortcut of the document has been formed in the shortcut forming step;

a determining step that determines, when a deletion of the document is instructed by a user, whether the history information indicates that the shortcut of the document has been formed;

a proxy data forming step that, when the deletion of the document is instructed by the user and the determining step determines that the history information indicates that the shortcut of the document has been formed, forms and stores proxy data into a same folder in which the document has been stored, wherein the first document ID of the document is set as a document ID of the proxy data, and wherein the proxy data forming step does not form and store the proxy data when the determining step determines that the history information indicates that the shortcut of the document has not been formed;

a moving step that, when the deletion of the document is instructed by the user, changes the first document ID of the document to another, second document ID and moves the changed document into a predetermined storing area that holds deleted data;

a changing step that, when a new document is registered into the folder where the proxy data is stored, sets the first document ID, which has been set to the proxy data, as a document ID of the new document; and a deleting step that, when the new document is registered into the folder where the proxy data is stored, deletes the proxy data.

8. A non-transitory computer-readable storage medium storing a computer program, the computer program causing a computer to execute:

a shortcut forming step that forms a shortcut of a document when a formation of the shortcut is instructed by a user, the shortcut including information of a first document ID of the document;

a registering step that registers history information that indicates whether the shortcut of the document has been formed in the shortcut forming step;

a determining step that determines, when a deletion of the document is instructed by a user, whether the history information indicates that the shortcut of the document has been formed;

a proxy data forming step that, when the deletion of the document is instructed by the user and the determining step determines that the history information indicates that the shortcut of the document has been formed, forms and stores proxy data into a same folder in which the document has been stored, wherein the first document ID of the document is set as a document ID of the proxy data, and wherein the proxy data forming step does not form and store the proxy data when the determining step determines that the history information indicates that the shortcut of the document has not been formed;

a moving step that, when the deletion of the document is instructed by the user, changes the first document ID of the document to another, second document ID and moves the changed document into a predetermined storing area that holds deleted data;

a changing step that, when a new document is registered into the folder where the proxy data is stored, sets the first document ID, which has been set to the proxy data, as a document ID of the new document; and a deleting step that, when the new document is registered into the folder where the proxy data is stored, deletes the proxy data.

* * * * *